(12) United States Patent
Kim

(10) Patent No.: US 12,512,064 B2
(45) Date of Patent: Dec. 30, 2025

(54) IMAGE DISPLAY APPARATUS

(71) Applicant: LG ELECTRONICS INC., Seoul (KR)

(72) Inventor: Dohoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/795,840

(22) Filed: Aug. 6, 2024

(65) Prior Publication Data

US 2025/0078763 A1    Mar. 6, 2025

(51) Int. Cl.
*G09G 3/3258* (2016.01)
*H02M 3/06* (2006.01)

(52) U.S. Cl.
CPC ............ *G09G 3/3258* (2013.01); *H02M 3/06* (2013.01); *G09G 2330/021* (2013.01); *G09G 2354/00* (2013.01)

(58) Field of Classification Search
CPC ......... G09G 2330/021; G09G 2354/00; G09G 3/3258; H02M 1/0035; H02M 3/01; H02M 3/06; H02M 3/33571
See application file for complete search history.

(56) References Cited

U.S. PATENT DOCUMENTS

| | | | | |
|---|---|---|---|---|
| 2003/0099122 | A1* | 5/2003 | Cho | H02M 3/33571 363/125 |
| 2015/0294617 | A1* | 10/2015 | Yoon | G09G 3/3225 345/212 |
| 2017/0294844 | A1* | 10/2017 | Nishijima | H02M 3/33571 |
| 2017/0345388 | A1* | 11/2017 | Hwang | G09G 3/20 |
| 2019/0172379 | A1* | 6/2019 | Park | H02M 1/32 |
| 2020/0043437 | A1* | 2/2020 | Pyun | G09G 3/20 |
| 2021/0057989 | A1* | 2/2021 | Jang | H02M 1/4225 |
| 2022/0085728 | A1* | 3/2022 | Mantooth | H02M 1/0058 |

* cited by examiner

*Primary Examiner* — Hong Zhou
(74) *Attorney, Agent, or Firm* — LEE, HONG, DEGERMAN, KANG & WAIMEY

(57) ABSTRACT

The image display apparatus according to an embodiment of the present disclosure includes: a display; a signal processing device; and a power supply to supply a display driving voltage to the display, wherein the power supply includes a converter including switching elements and to convert a level of an input DC voltage and output the display driving voltage, wherein in response to a load at an output terminal of the converter, the converter is configured to operate in a first mode, in which the switching elements perform a continuous switching operation at a first frequency, and in a second mode in which the switching elements perform the continuous switching operation and then stop the switching operation for a predetermined period or perform the switching operation at a second frequency lower than the first frequency. Accordingly, it is possible to reduce increase of output voltage under low-load or no-load conditions.

16 Claims, 22 Drawing Sheets

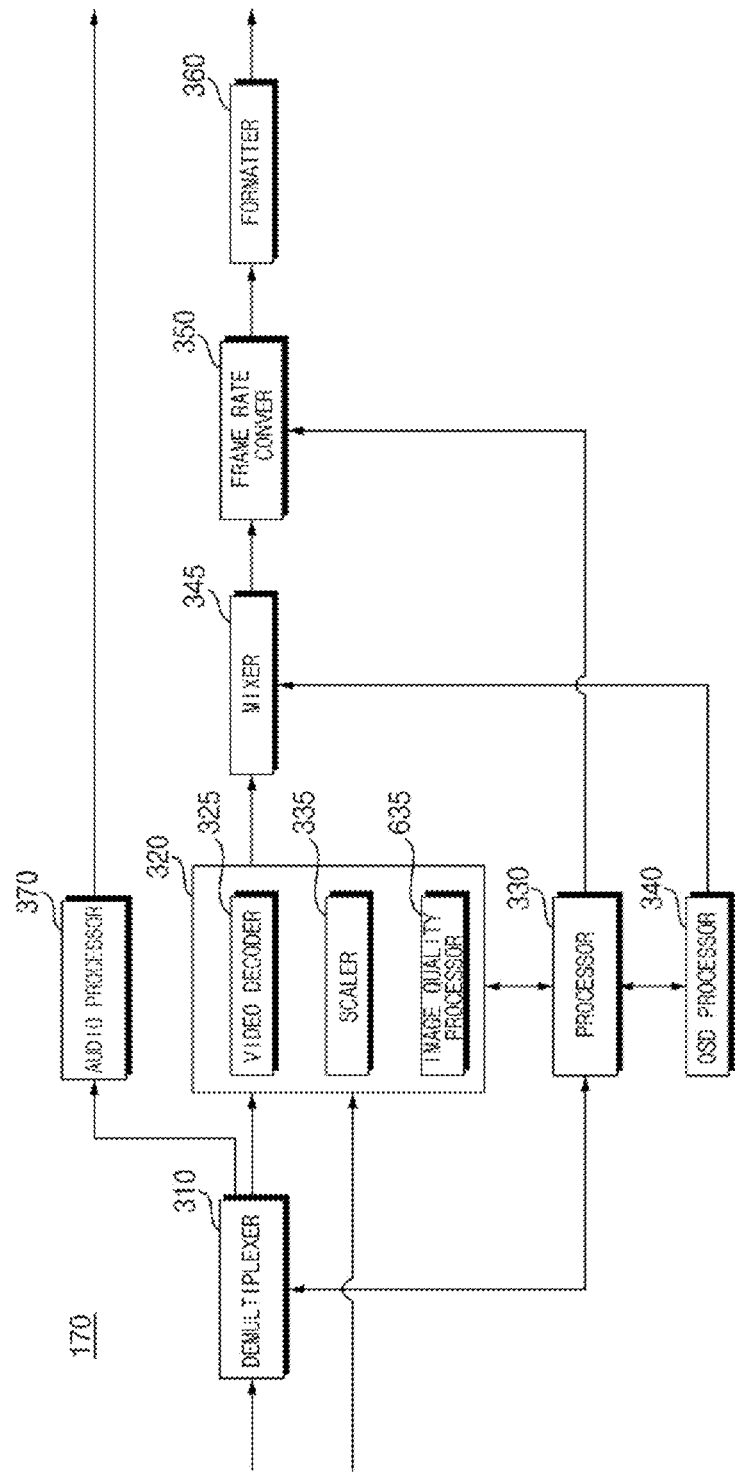

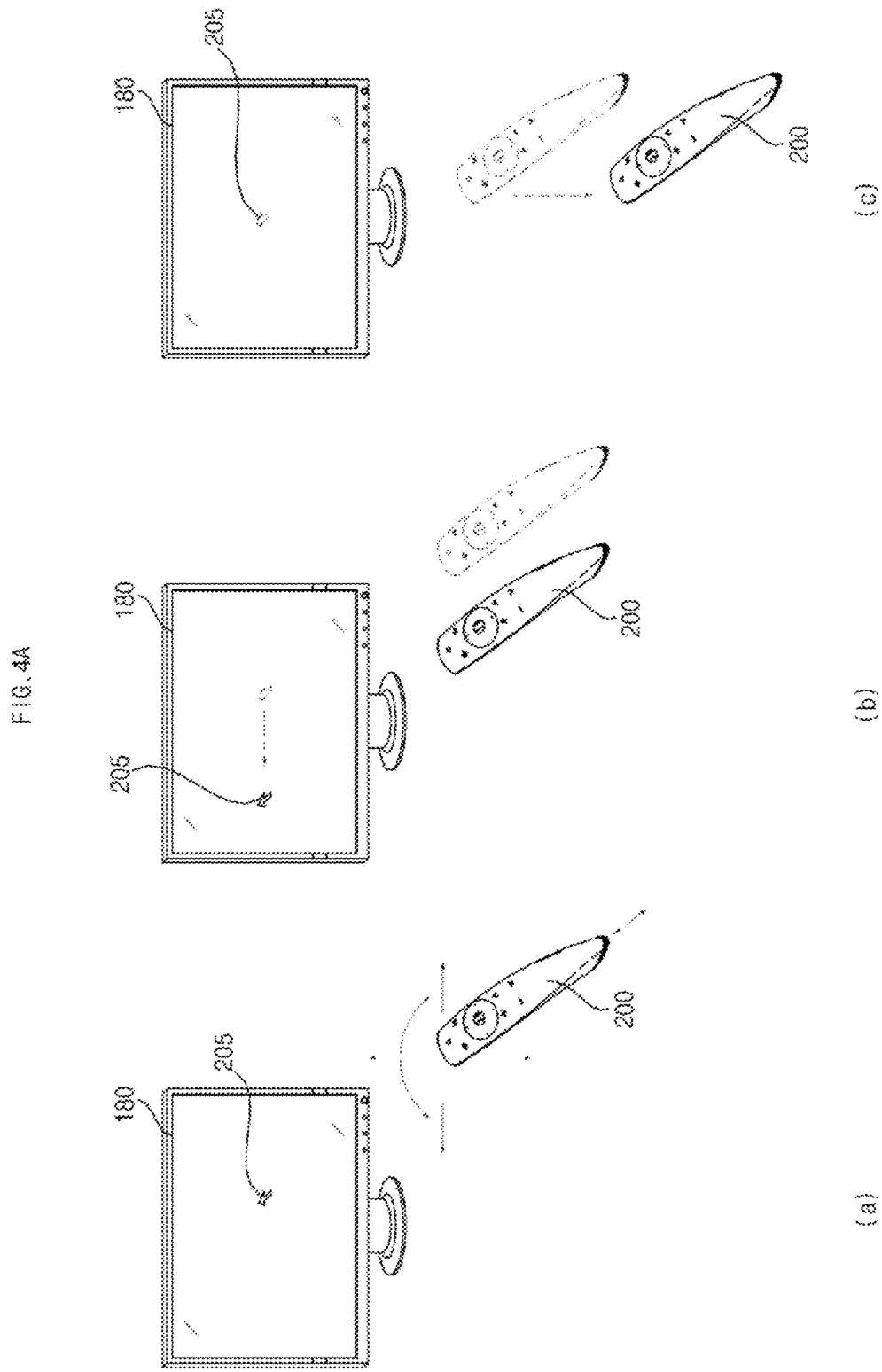

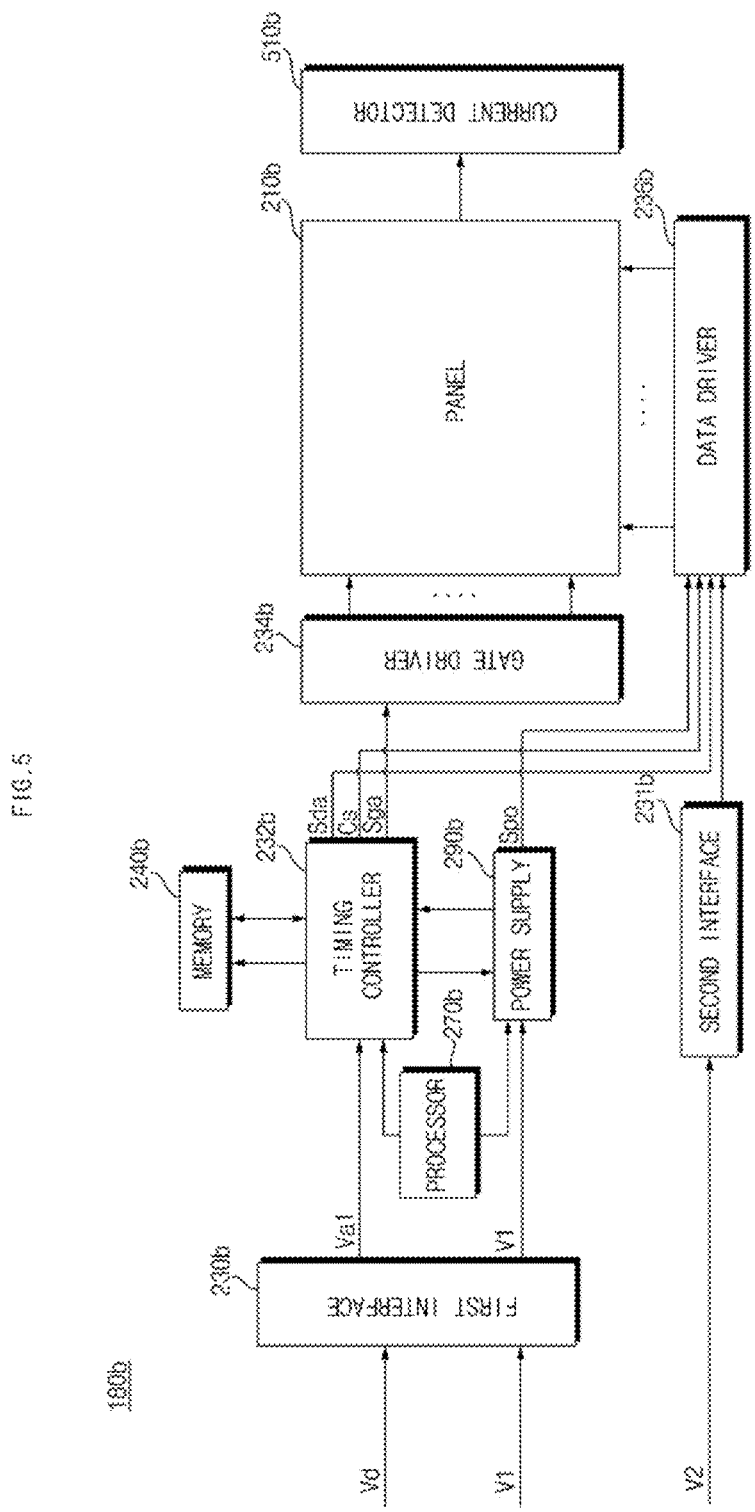

IMAGE DISPLAY APPARATUS

CROSS-REFERENCE TO RELATED APPLICATION

Pursuant to 35 U.S.C. § 119(a), this application claims the benefit of earlier filing date and right of priority to Korean Patent Application No. 10-2023-0115587, filed on Aug. 31, 2023, the contents of which are hereby incorporated by reference herein in its entirety.

BACKGROUND

Field

The present disclosure relates to an image display apparatus, and more particularly to an image display apparatus capable of reducing increase of output voltage under low-load or no-load conditions.

Description of the Related Art

An image display apparatus is an apparatus that displays images.

Recently, in keeping with the increase in image resolution and the increase in image sharpness, the display resolution or peak luminance of a display in an image display apparatus is increasing.

As the display resolution or peak luminance of a display becomes higher, the consumption of power supplied to the display increases.

Meanwhile, if load of the display decreases or the display is in a no-load state, a voltage supplied to the display increases.

SUMMARY

It is an objective of the present disclosure to provide an image display apparatus capable of reducing increase of output voltage under low-load or no-load conditions.

It is another objective of the present disclosure to provide an image display apparatus capable of stably supplying a display driving voltage.

It is yet another objective of the present disclosure to provide an image display apparatus capable of reducing power consumption of a power supply.

In order to achieve the above and other objectives, an image display apparatus according to an embodiment of the present disclosure includes: a display; a signal processing device configured to output an image signal to the display; and a power supply configured to supply a display driving voltage to the display, wherein the power supply comprises a converter including switching elements and configured to convert a level of an input DC voltage based on a switching operation of the switching elements and output the display driving voltage, wherein in response to a load at an output terminal of the converter, the converter is configured to operate in a first mode, in which the switching elements perform a continuous switching operation at a first frequency, and in a second mode in which the switching elements perform the continuous switching operation and then stop the switching operation for a predetermined period or perform the switching operation at a second frequency lower than the first frequency.

Meanwhile, in response to the load at the output terminal of the converter being lower than or equal to a reference value, the converter may be configured to operate in the second mode in which the switching elements perform the continuous switching operation and then stop the switching operation for the predetermined period or perform the switching operation at the second frequency.

Meanwhile, in response to a black image being displayed on the display, the converter may be configured to operate in the second mode in which the switching elements perform the continuous switching operation and then stop the switching operation for the predetermined period or perform the switching operation at the second frequency.

Meanwhile, the converter may include: a transformer; a first switching element and a second switching element disposed at an input terminal of the transformer and connected in series with each other; and a resonant capacitor and a resonant inductor disposed between and respectively connected to the input terminal of the transformer and the second switching element.

Meanwhile, the converter may further include: full-bridge diodes disposed at an output terminal of the transformer; and a capacitor element disposed at an output terminal of the full-bridge diodes.

Meanwhile, it is desirable that the resistor element is not disposed at both ends of the capacitor element.

Meanwhile, the second frequency may correspond to a frequency outside an audible frequency range.

Meanwhile, the converter may further include a voltage detection circuit configured to detect a voltage across the second switching element.

Meanwhile, in response to the voltage across the second switching element, which is detected by the voltage detection circuit, being zero voltage, the converter may be configured to turn on the second switching element.

Meanwhile, during operation in the second mode, in response to the voltage across the second switching element, which is detected by the voltage detection circuit, being zero voltage, the converter may be configured to turn on the second switching element.

Meanwhile, the voltage detection circuit may include: a capacitor connected to a first node between the first switching element and the second switching element; a Zener diode disposed between the capacitor and a ground terminal; and a resistor element having one end connected to a second node between the capacitor and the Zener diode.

Meanwhile, the converter may further include a switching controller configured to control the first switching element and the second switching element, wherein the switching controller may be configured to control zero voltage switching of the second switching element based on a voltage at the second node.

Meanwhile, the power supply may further include a second converter configured to convert an input AC voltage into a DC voltage, wherein the converter may be configured to convert the DC voltage from the second converter and output the display driving voltage to the display.

Meanwhile, the signal processing device may be configured to: in response to a display power control-on mode being selected in a settings screen, control the power supply to supply a display driving voltage of a first level to the display; and in response to a display power control-off mode being selected in the settings screen, control the power supply to supply a display driving voltage of a second level to the display.

Meanwhile, the signal processing device may be configured to: in response to a display power control-on mode being selected in a settings screen, control the power supply to supply the display driving voltage of the first level to the display based on the second mode; and in response to a display power control-off mode being selected in the settings screen, control the power supply to supply the display driving voltage of the second level to the display based on the first mode.

An image display apparatus according to another embodiment of the present disclosure includes: a display; a signal processing device configured to output an image signal to the display; and a power supply configured to supply a display driving voltage to the display, wherein the power supply includes a converter including switching elements and configured to convert a level of an input DC voltage based on a switching operation of the switching elements and output the display driving voltage, wherein in response to a load at an output terminal of the converter, the converter is configured to operate in a first mode, in which the switching elements perform a continuous switching operation with a first duty, and in a second mode in which the switching elements perform the switching operation with a second duty less than the first duty.

Meanwhile, in response to the load at the output terminal of the converter being lower than or equal to a reference value, the converter may be configured to operate in the second mode in which the switching elements perform the switching operation with the second duty.

Meanwhile, in response to a black image being displayed on the display, the converter may be configured to operate in the second mode in which the switching elements perform the switching operation with the second duty.

Meanwhile, the converter may include: a transformer; a first switching element and a second switching element disposed at an input terminal of the transformer and connected in series with each other; and a resonant capacitor and a resonant inductor disposed between and respectively connected to the input terminal of the transformer and the second switching element.

BRIEF DESCRIPTION OF THE DRAWINGS

The above and other objects, features and other advantages of the present disclosure will be more clearly understood from the following detailed description taken in conjunction with the accompanying drawings, in which:

FIG. 3 is an example of an internal block diagram of a signal processing device of FIG. 2;

FIG. 4A is a diagram showing a method of controlling a remote controller of FIG. 2;

FIG. 5 is an exemplary internal block diagram of a display of FIG. 2;

DETAILED DESCRIPTION OF THE PREFERRED EMBODIMENTS

Hereinafter, the present disclosure will be described in detail with reference to the accompanying drawings.

Regarding constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
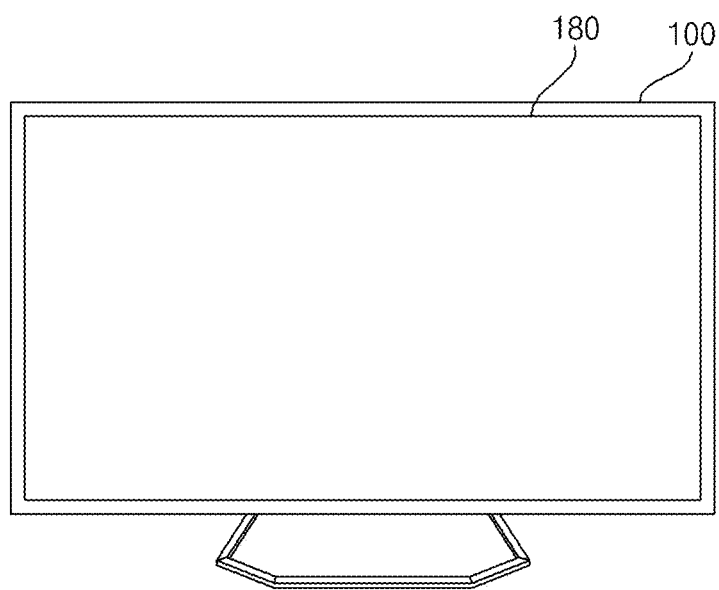
FIG. 1 is a diagram showing an image display apparatus according to an embodiment of the present disclosure.

FIG. 1 is a diagram showing an image display apparatus according to an embodiment of the present disclosure.

Referring to the figure, an image display apparatus 100 may include a display 180.

The display resolution of the display 180 is getting higher and higher from 2K to 4K to 8K to 16K and higher, and the peak luminance of the display 180 is also increasing. Accordingly, the consumption of power supplied to the display 180 becomes higher.

Meanwhile, the display 180 may be implemented by one of various panels. For example, the display 180 may be one of a liquid crystal display panel (LCD panel), an organic light-emitting panel (OLED panel), and an inorganic light-emitting panel (LED panel).

The liquid crystal display panel may require a backlight in addition to a panel for image display.

On the other hand, the organic light-emitting panel or the inorganic light-emitting panel requires no backlight for image display.

The image display apparatus 100 according to an embodiment of the present disclosure provides a method of reducing increase of output voltage under low-load or no-load conditions, such as in the case where an image displayed on the display 180 is a black image.

To this end, the image display apparatus according to an embodiment of the present disclosure includes a display 180, a signal processing device 170 (see FIG. 2) configured to output an image signal to the display 180, and a power supply 190 (see FIG. 2) configured to supply a display driving voltage to the display 180.

Meanwhile, the power supply 190 according to an embodiment of the present disclosure includes a converter 910 (see FIG. 7) including switching elements and configured to convert an input direct-current (DC) voltage level based on a switching operation of the switching elements to output a display driving voltage.

Meanwhile, the converter 910 (see FIG. 8) according to an embodiment of the present disclosure operates in a first mode or a second mode in response to a load at an output terminal of the converter, in which in the first mode, the switching elements perform a continuous switching operation at a first frequency, and in the second mode, the switching elements perform the continuous switching operation and then stop the switching operation for a predetermined period or perform the switching operation at a second frequency lower than the first frequency. Accordingly, it is possible to reduce increase of output voltage under low-load or no-load conditions. In addition, the display driving voltage may be stably supplied. Further, power consumption of the power supply 190 may be reduced.

Meanwhile, the converter 910 (see FIG. 8) according to another embodiment of the present disclosure operates in a first mode or a second mode in response to a load at an output terminal of the converter, in which in the first mode, the switching elements perform a continuous switching operation with a first duty, and in a second mode the switching elements perform the switching operation with a second duty less than the first duty. Accordingly, it is possible to reduce increase of output voltage under low-load or no-load conditions. In addition, the display driving voltage may be stably supplied. Further, power consumption of the power supply 190 may be reduced.

Meanwhile, the image display apparatus 100 of FIG. 1 may be a TV, a monitor, a vehicle display device, a tablet PC, a mobile terminal, and the like.

Figure 2:
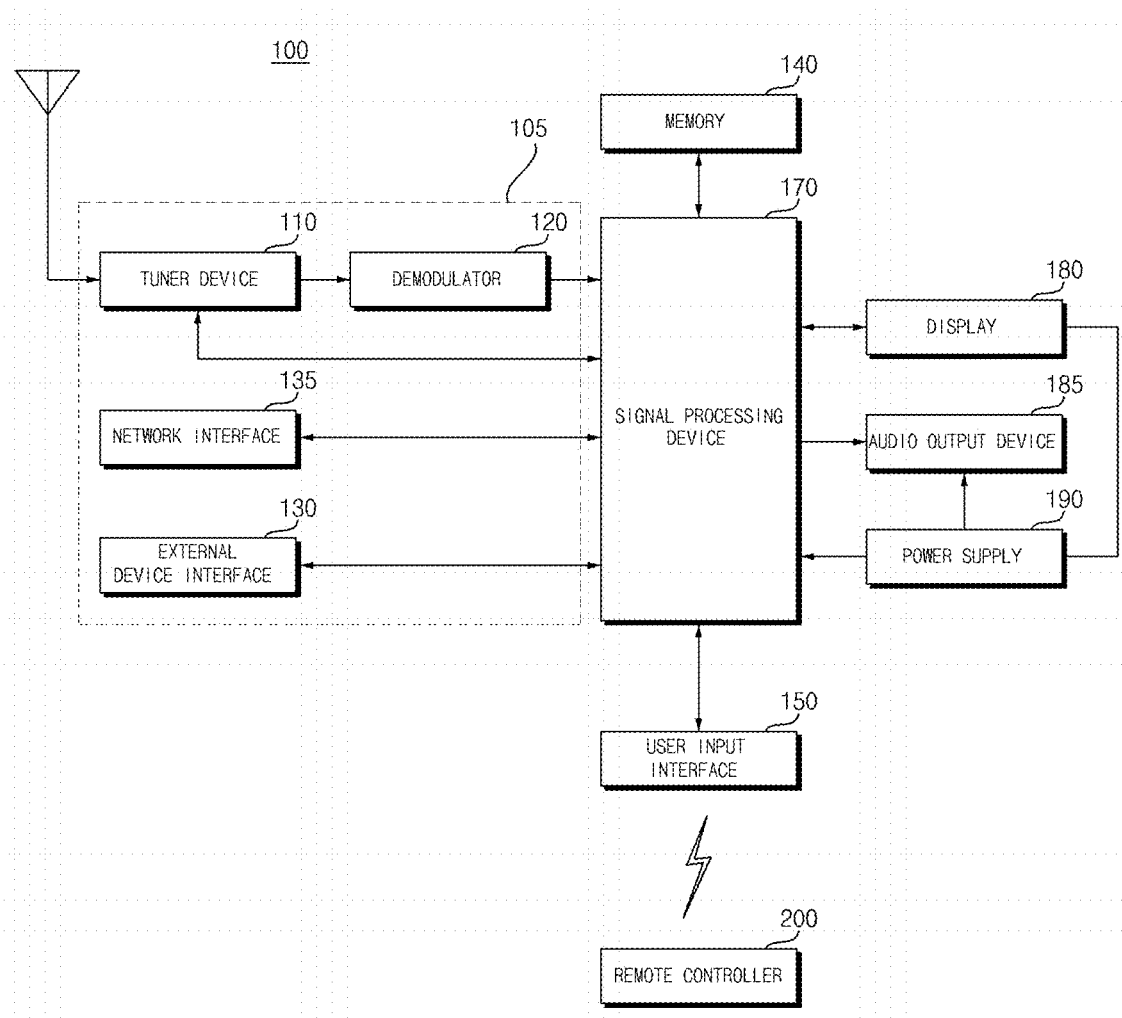
FIG. 2 is an example of an internal block diagram of the image display apparatus.

FIG. 2 is an example of an internal block diagram of the image display apparatus of FIG. 1.

Referring to FIG. 2, the image display apparatus 100 according to an embodiment of the present disclosure includes an image receiver 105, an external apparatus interface 130, a memory 140, a user input interface 150, a sensor device (not shown), a signal processing device 170, a display 180, and an audio output device 185.

The image receiver 105 may include a tuner 110, a demodulator 120, a network interface 135, and an external apparatus interface 130.

Meanwhile, unlike the figure, the image receiver 105 may include only the tuner 110, the demodulator 120, and the external apparatus interface 130. That is, the network interface 135 may not be included.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, the tuner 110 converts the digital broadcast signal into a digital IF (DIF) signal and, if the selected RF broadcast signal is an analog broadcast signal, the tuner 110 converts the analog broadcast signal into an analog baseband image or voice (CVBS/SIF) signal. That is, the tuner 110 may process a digital broadcast signal or an analog broadcast signal. The analog baseband image or voice (CVBS/SIF) signal output from the tuner 110 may be directly input to the signal processing device 170.

Meanwhile, the tuner 110 may include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processing device 170. The signal processing device 170 performs demultiplexing, image/audio signal processing, and the like, and then outputs an image to the display 180 and outputs audio to the audio output device 185.

The external apparatus interface 130 may transmit or receive data with a connected external apparatus (not shown), e.g., a set-top box 50. To this end, the external apparatus interface 130 may include an A/V input and output device (not shown).

The external apparatus interface 130 may be connected in wired or wirelessly to an external apparatus, such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless transceiver (not shown) may perform short-range wireless communication with other electronic apparatus.

Through the wireless transceiver (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless transceiver (not shown).

The memory 140 may store a program for each signal processing and control in the signal processing device 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function, such as a channel map.

Although FIG. 2 illustrates that the memory is provided separately from the signal processing device 170, the scope of the present disclosure is not limited thereto. The memory 140 may be included in the signal processing device 170.

The user input interface 150 transmits a signal input by the user to the signal processing device 170 or transmits a signal from the signal processing device 170 to the user.

For example, it may transmit/receive a user input signal, such as power on/off, channel selection, screen setting, etc., from a remote controller 200, may transfer a user input signal input from a local key (not shown), such as a power key, a channel key, a volume key, a set value, etc., to the signal processing device 170, may transfer a user input signal input from a sensor device (not shown) that senses a user's gesture to the signal processing device 170, or may transmit a signal from the signal processing device 170 to the sensor device (not shown).

The signal processing device 170 may demultiplex the input stream through the tuner 110, the demodulator 120, the network interface 135, or the external apparatus interface 130, or process the demultiplexed signals to generate and output a signal for image or audio output.

For example, the signal processing device 170 receives a broadcast signal received by the image receiver 105 or an HDMI signal, and perform signal processing based on the received broadcast signal or the HDMI signal to thereby output a processed image signal.

The image signal processed by the signal processing device 170 is input to the display 180, and may be displayed as an image corresponding to the image signal. In addition, the image signal processed by the signal processing device 170 may be input to the external output apparatus through the external apparatus interface 130.

The audio signal processed by the signal processing device 170 may be output to the audio output device 185 as an audio signal. In addition, audio signal processed by the signal processing device 170 may be input to the external output apparatus through the external apparatus interface 130.

Although not shown in FIG. 2, the signal processing device 170 may include a demultiplexer, an image processor, and the like. That is, the signal processing device 170 may perform a variety of signal processing and thus it may be implemented in the form of a system on chip (SOC). This will be described later with reference to FIG. 3.

In addition, the signal processing device 170 may control the overall operation of the image display apparatus 100. For example, the signal processing device 170 may control the tuner 110 to control the tuning of the RF broadcast corresponding to the channel selected by the user or the previously stored channel.

In addition, the signal processing device 170 may control the image display apparatus 100 according to a user command input through the user input interface 150 or an internal program.

Meanwhile, the signal processing device 170 may control the display 180 to display an image. At this time, the image displayed on the display 180 may be a still image or a moving image, and may be a 2D image or a 3D image.

Meanwhile, the signal processing device 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processing device 170 may recognize the position of the user based on the image photographed by a photographing device (not shown). For example, the distance (z-axis coordinate) between a user and the image display apparatus 100 may be determined. In addition, the x-axis coordinate and the y-axis coordinate in the display 180 corresponding to a user position may be determined.

The display 180 generates a driving signal by converting an image signal, a data signal, an OSD signal, a control signal processed by the signal processing device 170, an image signal, a data signal, a control signal, and the like received from the external apparatus interface 130.

Meanwhile, the display 180 may be configured as a touch screen and used as an input device in addition to an output device.

The audio output device 185 receives a signal processed by the signal processing device 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processing device 170.

The signal processing device 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a signal processing device 170 which may be implemented in the form of a system on chip (SOC), a display 180 for displaying an image, and an audio output device 185 for outputting an audio.

Specifically, the power supply 190 may include a converter to convert an AC power into a DC voltage, and a DC/DC converter to convert the level of the DC voltage.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcast receiver capable of receiving digital broadcast.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be split into two or more components. The function performed in each block is described for the purpose of illustrating embodiments of the present disclosure, and specific operation and apparatus do not limit the scope of the present disclosure.

FIG. 3 is an example of an internal block diagram of the signal processing device in FIG. 2.

Referring to the figure, the signal processing device 170 according to an embodiment of the present disclosure may include a demultiplexer 310, an image processor 320, a processor 330, and an audio processor 370. In addition, the signal processing device 170 may further include and a data processor (not shown).

The demultiplexer 310 demultiplexes the input stream. For example, when an MPEG-2 TS is input, it may be demultiplexed into image, audio, and data signal, respectively. Here, the stream signal input to the demultiplexer 310 may be a stream signal output from the tuner 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal may be output from the display 180.

The image decoder 325 may include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 635 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The OSD processor 340 generates an OSD signal according to a user input or by itself. For example, based on a user input signal, the OSD processor 340 may generate a signal for displaying various information as a graphic or a text on the screen of the display 180. The generated OSD signal may include various data, such as a user interface screen of the image display apparatus 100, various menu screens, a widget, and an icon. In addition, the generated OSD signal may include a 2D object or a 3D object.

In addition, the OSD processor 340 may generate a pointer that may be displayed on the display, based on a pointing signal input from the remote controller 200. In particular, such a pointer may be generated by a pointing signal processing device, and the OSD processor 340 may include such a pointing signal processing device (not shown). Obviously, the pointing signal processing device (not shown) may be provided separately from the OSD processor 340.

The frame rate converter (FRC) 350 may convert a frame rate of an input image. Meanwhile, the frame rate converter 350 may output the input image without converting the frame rate.

Meanwhile, the formatter 360 may change a format of an input image signal into a format suitable for displaying the image signal on a display and output the image signal in the changed format.

In particular, the formatter 360 may change a format of an image signal to correspond to a display panel.

Further, the formatter 360 may convert the format of an image signal. For example, the formatter 360 may convert the format of a 3D image signal into one of various 3D formats, including a side-by-side format, a top/down format, a frame sequential format, an interlaced format, a checker box format, etc.

The processor 330 may control overall operations of the image display apparatus 100 or the signal processing device 170.

For example, the processor 330 may control the tuner 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the signal processing device 170.

Meanwhile, the audio processor 370 in the signal processing device 170 may perform the audio processing of the demultiplexed audio signal. To this end, the audio processor 370 may include various decoders.

In addition, the audio processor 370 in the signal processing device 170 may process a base, a treble, a volume control, and the like.

The data processor (not shown) in the signal processing device 170 may perform data processing of the demultiplexed data signal. For example, when the demultiplexed data signal is a coded data signal, it may be decoded. The encoded data signal may be electronic program guide information including broadcast information, such as a start time and an end time of a broadcast program broadcasted on each channel.

Meanwhile, a block diagram of the signal processing device 170 shown in FIG. 3 is a block diagram for an embodiment of the present disclosure. Each component of the block diagram may be integrated, added, or omitted according to a specification of the signal processing device 170 actually implemented.

In particular, the frame rate converter 350 and the formatter 360 may be provided separately in addition to the image processor 320.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the figure.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180, while pressing a specific button of the remote controller 200. Thus, a selection area within the display 180 corresponding to the pointer 205 may be zoomed in so that it may be displayed to be enlarged. Meanwhile, when the user moves the remote controller 200 close to the display 180, the selection area within the display 180 corresponding to the pointer 205 may be zoomed out so that it may be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
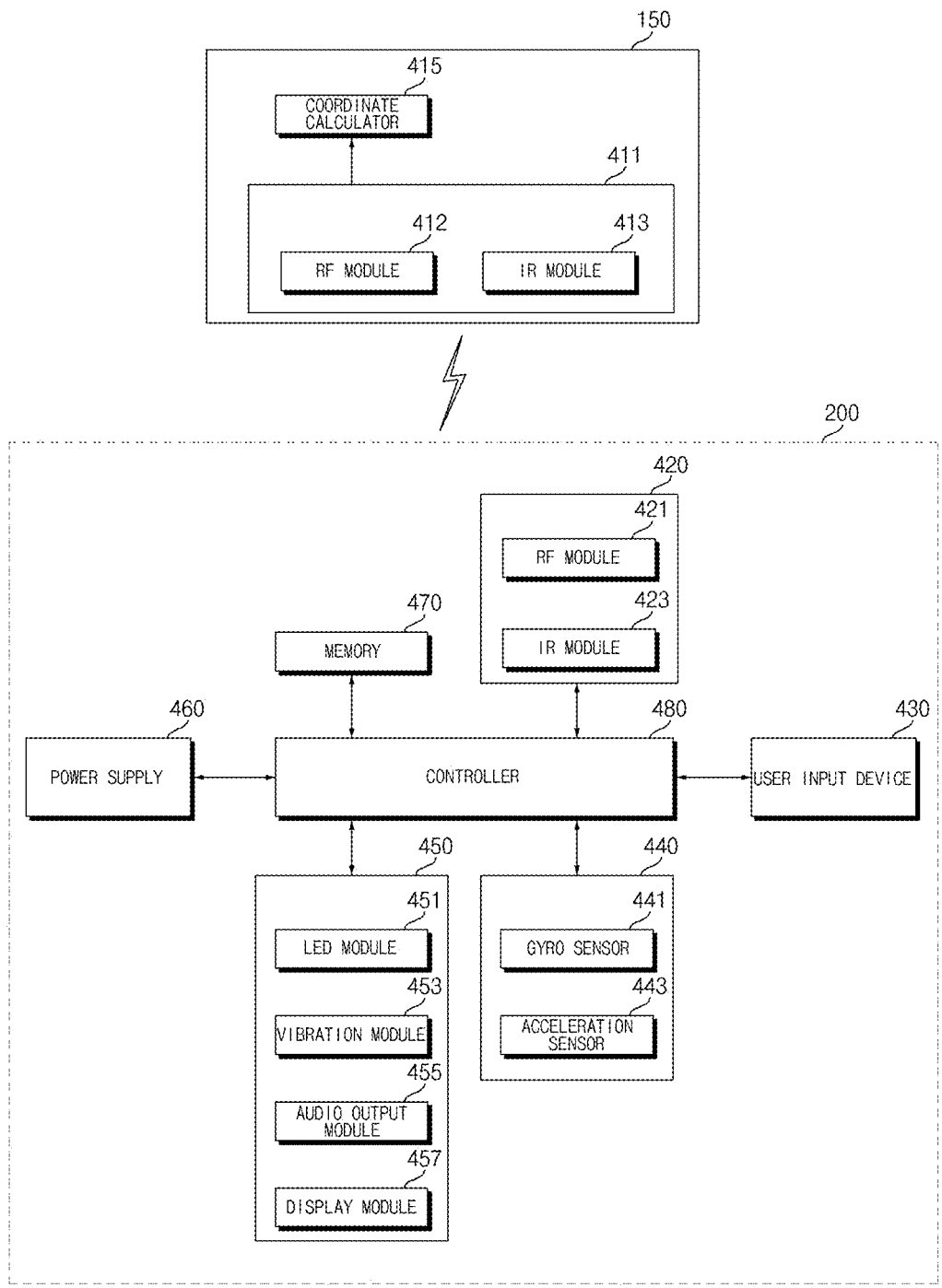
FIG. 4B is an internal block diagram of the remote controller of FIG. 2.

FIG. 4B is an internal block diagram of the remote controller of FIG. 2.

Referring to the figure, the remote controller 200 includes a wireless transceiver 425, a user input device 435, a sensor device 440, an output device 450, a power supply 460, a memory 470, and a controller 480.

The wireless transceiver 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 435 may be implemented by a keypad, a button, a touch pad, a touch screen, or the like. The user may operate the user input device 435 to input a command related to the image display apparatus 100 to the remote controller 200. When the user input device 435 includes a hard key button, the user may input a command related to the image display apparatus 100 to the remote controller 200 through a push operation of the hard key button. When the user input device 435 includes a touch screen, the user may touch a soft key of the touch screen to input the command related to the image display apparatus 100 to the remote controller 200. In addition, the user input device 435 may include various types of input means, such as a scroll key, a jog key, etc., which may be operated by the user, and the present disclosure does not limit the scope of the present disclosure.

The sensor device 440 may include a gyro sensor 441 or an acceleration sensor 443. The gyro sensor 441 may sense information regarding the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 435 or a signal transmitted from the image display apparatus 100. Through the output device 450, the user may recognize whether the user input device 435 is operated or whether the image display apparatus 100 is controlled.

For example, the output device 450 may include an LED module 451 that is turned on when the user input device 435 is operated or a signal is transmitted/received to/from the image display apparatus 100 through the wireless transceiver 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information regarding a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 435 or a signal corresponding to the motion of the remote controller 200 sensed by the sensor device 440 to the image display apparatus 100 through the wireless transceiver 425.

The user input interface 150 of the image display apparatus 100 includes a wireless transceiver 151 that may wirelessly transmit and receive a signal to and from the remote controller 200 and a coordinate value calculator 415 that may calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless transceiver 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the figure, the coordinate value calculator 415 may be provided in the signal processing device 170, not in the user input interface 150.

FIG. 5 is an exemplary internal block diagram of a display of FIG. 2.

Referring to FIG. 5, an organic light-emitting panel-based display 180b may include an organic light-emitting panel 210b, a first interface 230b, a second interface 231b, a timing controller 232b, a gate driver 234b, a data driver 236b, a memory 240b, a processor 270b, a power supply 290b, a current detector 510b, and the like.

The display 180b receives an image signal Vdb, a first DC voltage V1b, and a second DC voltage V2b, and may display a certain image based on the image signal Vdb.

Meanwhile, the first interface 230b in the display 180b may receive the image signal Vdb and the first DC voltage V1b from the signal processing device 170b.

Here, the first DC voltage V1b may be used for the operation of the power supply 290b and the timing controller 232b in the display 180b.

Next, the second interface 231b may receive a second DC voltage V2b from an external power supply 190b. Meanwhile, the second DC voltage V2b may be input to the data driver 236b in the display 180b.

The timing controller 232b may output a data driving signal Sdab and a gate driving signal Sgab, based on the image signal Vdb.

For example, when the first interface 230b converts the input image signal Vdb and outputs the converted image signal va1b, the timing controller 232b may output the data driving signal Sdab and the gate driving signal Sgab based on the converted image signal va1b.

The timing controller 232b may further receive a control signal, a vertical synchronization signal Vsyncb, and the like, in addition to the image signal Vdb from the signal processing device 170b.

In addition to the image signal Vdb, based on a control signal, a vertical synchronization signal Vsyncb, and the like, the timing controller 232b generates a gate driving signal Sgab for the operation of the gate driver 234b, and a data driving signal Sdab for the operation of the data driver 236b.

At this time, when the panel 210b includes a RGBW subpixel, the data driving signal Sdab may be a data driving signal for driving of RGBW subpixel.

Meanwhile, the timing controller 232b may further output a control signal Csb to the gate driver 234b.

The gate driver 234b and the data driver 236b supply a scan signal and an image signal to the organic light-emitting panel 210b through a gate line GLb and a data line DLb, respectively, according to the gate driving signal Sgab and the data driving signal Sdab from the timing controller 232b. Accordingly, the organic light-emitting panel 210b displays a certain image.

Meanwhile, the panel 210b may include an organic light emitting layer. In order to display an image, a plurality of gate lines GLb and data lines DLb may be disposed in a matrix form in each pixel corresponding to the organic light emitting layer.

Meanwhile, the data driver 236b may output a data signal to the organic light-emitting panel 210b based on a second DC voltage V2b from the second interface 231b.

The power supply 290b may supply various power supplies to the gate driver 234b, the data driver 236b, the timing controller 232b, and the like.

The current detector 510b may detect the current flowing in a sub-pixel of the panel 210b. The detected current may be input to the processor 270b or the like, for a cumulative current calculation.

The processor 270b may perform each type of control of the display 180b. For example, the processor 270b may control the gate driver 234b, the data driver 236b, the timing controller 232b, and the like.

Meanwhile, the processor 270b may receive current information flowing in a sub-pixel of the panel 210b from the current detector 510b.

Figure 6A:
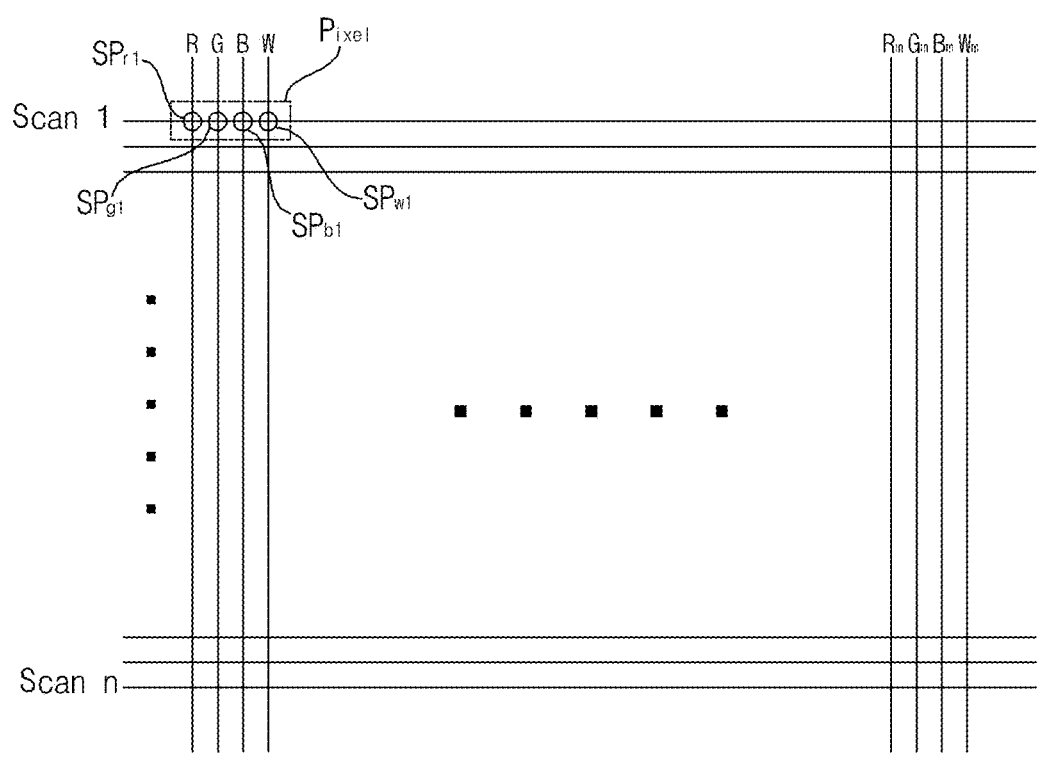
FIGS. 6A and 6B are diagrams referred to in the description of an organic light-emitting panel of FIG. 5.
Figure 6B:
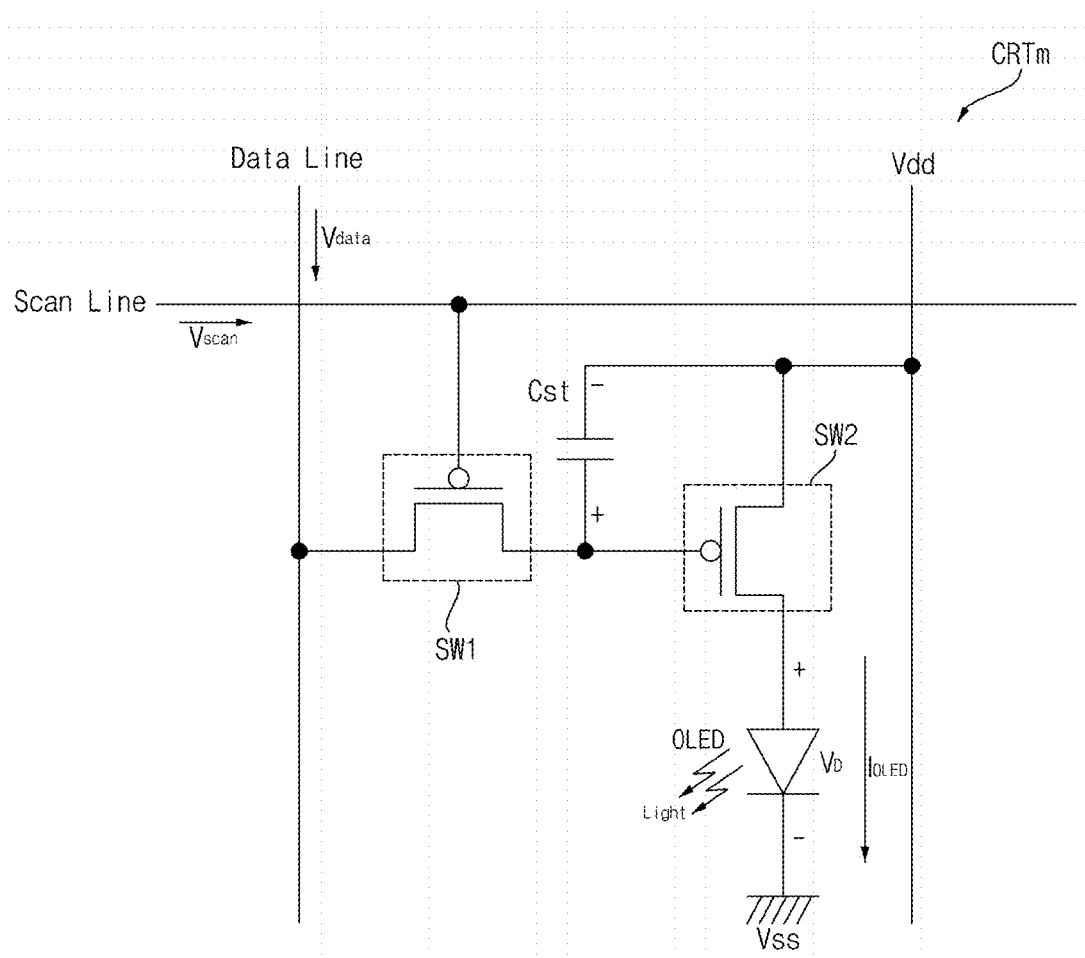

FIGS. 6A and 6B are diagrams referred to in the description of an organic light-emitting panel of FIG. 5.

First, FIG. 6A is a diagram illustrating a pixel in the organic light-emitting panel 210b.

Referring to the figure, the organic light-emitting panel 210b may include a plurality of scan lines Scan1 to Scann and a plurality of data lines R1, G1, B1, W1 to Rm, Gm, Bm, Wm intersecting the scan lines.

Meanwhile, a pixel (subpixel) is defined in an intersecting area of the scan line and the data line in the organic light-emitting panel 210b. In the figure, a pixel including sub-pixels SR1, SG1, SB1, and SW1 of RGBW is shown.

FIG. 6B illustrates a circuit of any one sub-pixel in the pixel of the organic light-emitting panel of FIG. 6A.

Referring to the figure, an organic light-emitting sub pixel circuit CRTm may include, as an active type, a scan switching element SW1, a storage capacitor Cst, a drive switching element SW2, and an organic light emitting layer OLED.

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC voltage (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a pulse width modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the figure, it is illustrated that a p-type MOSFET is used for a scan switching element SW1 and a drive switching element SW2, but an n-type MOSFET or other switching element, such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Figure 7:
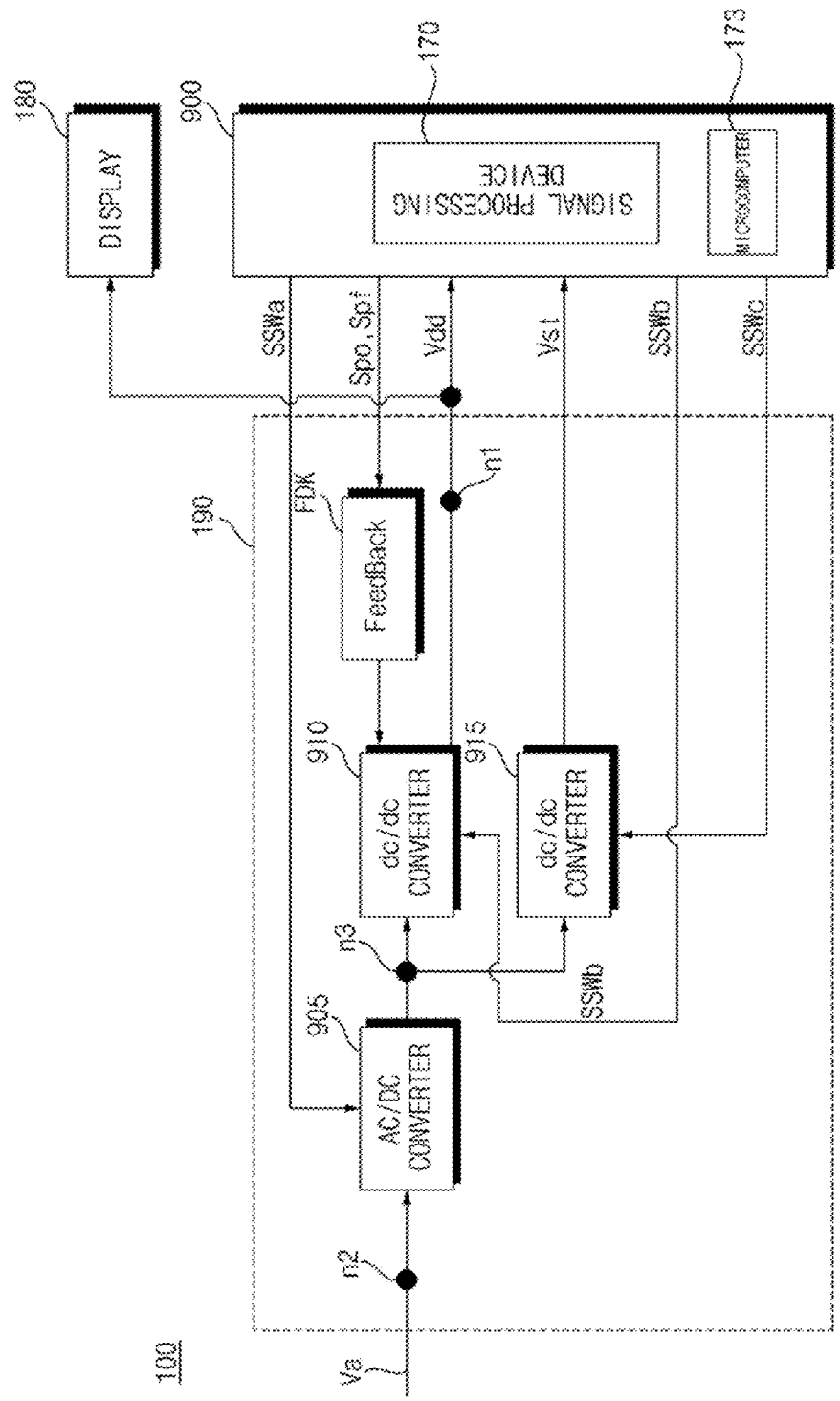
FIG. 7 is an exemplary internal block diagram of an image display apparatus according to an embodiment of the present disclosure.

FIG. 7 is an exemplary internal block diagram of an image display apparatus according to an embodiment of the present disclosure.

Referring to the drawing, the image display apparatus 100 according to an embodiment of the present disclosure includes a display 180, a signal processing device 170 configured to output an image signal to the display 180, and a converter 910 configured to supply a display driving voltage to the display 180.

The power supply 190 according to an embodiment of the present disclosure may include an ac/dc converter 905 for converting an input AC voltage into a DC voltage, and a dc/dc converter 910 for converting the level of the DC voltage from the ac/dc converter 905 to output a display driving voltage Vdd.

The figure illustrates that the ac/dc converter 905 is disposed between Node n2, which is an input terminal of the power supply 190, and an input node n3 of the dc/dc converter 910.

Meanwhile, an output node n1 of the ac/dc converter 905 may be electrically connected to the display 180.

The ac/dc converter 905 may include a diode or a switching element, and convert an input AC voltage Va into a DC voltage of a first level and output it.

The dc/dc converter 910 may converter an input DC voltage of the first level and output a display driving voltage VDD of a second level.

For example, the converter 910 may boost the DC voltage of the first level and output the display driving voltage Vdd of the second level higher than the first level.

On the one hand, if the display 180 is an organic light-emitting panel, the display driving voltage Vdd may be a pixel driving voltage for an organic light-emitting pixel.

On the other hand, if the display 180 is an inorganic light-emitting panel, the display driving voltage Vdd may be a pixel driving voltage for an inorganic light-emitting pixel.

On the other hand, if the display 180 is a liquid crystal panel, the display driving voltage Vdd may be a backlight driving voltage or a liquid crystal pixel driving voltage.

Meanwhile, the image display apparatus 100 according to an embodiment of the present disclosure further includes a main board 900 including a signal processing device 170 and a microcomputer 173.

The signal processing device 170 may output an image signal to the display 180.

Upon receiving a remote control signal, the microcomputer 173 may be operated to control the operation of the signal processing device 170 or the power supply 190.

The power supply 190 according to an embodiment of the present disclosure may output a microcomputer driving voltage Vst for the operation of the microcomputer 173.

To this end, the power supply 190 according to an embodiment of the present disclosure may further include a second dc/dc converter 915 for converting an input DC voltage of a first level to output a microcomputer driving voltage Vst of a third level.

At this time, the microcomputer driving voltage Vst may be lower than the display driving voltage Vdd.

Meanwhile, the mainboard 900 or the signal processing device 170 may output a display-on signal Spo or a display-off signal Spf to the power supply 190.

Accordingly, if the display 180 is on, the dc/dc converter 910 may be operated, and if the display 180 is off, the dc/dc converter 910 may stop operating.

On the one hand, the main board 900 or the signal processing device 170 may output a switch driving control signal SSwa to the ac/dc converter 905. Accordingly, the ac/dc converter 905 may be stably driven.

On the other hand, the mainboard 900 or the signal processing device 170 may output a switch driving control signal SSwb to the dc/dc converter 910. Accordingly, the dc/dc converter 910 may be stably driven.

On the other hand, the mainboard 900 or the signal processing device 170 may output a switch driving control signal SSwc to the second dc/dc converter 915. Accordingly, the second dc/dc converter 915 may be stably driven.

Meanwhile, the power supply 190 may further include a signal transmitter FDK connected between the converter 910 and the mainboard 900.

The signal transmitter FDK may receive a display-on signal Spo or a display-off signal Spf from the mainboard 900 including the signal processing device 170 or from the signal processing device 170, and transmit the display-on signal Spo or the display-off signal Spf to the converter 910.

Figure 8:
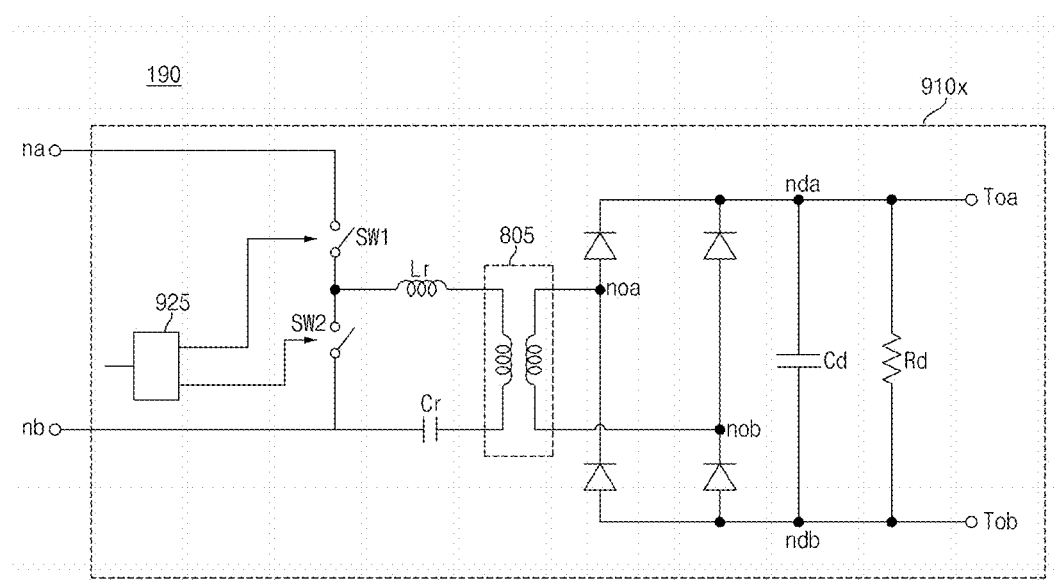
FIG. 8 is an exemplary circuit diagram of a power supply related to the present disclosure.

FIG. 8 is an exemplary circuit diagram of a power supply related to the present disclosure.

Referring to the drawing, a power supply 190x related to the present disclosure includes a converter 910x configured to output a display driving voltage.

The converter 910x includes switching elements SW1 and SW2 which are disposed at an input terminal of the transformer 805 and connected in series to each other, a capacitor Cr and an inductor Lr which are disposed between the switching element SW2 and the transformer 805, full-bridge diodes disposed at an output terminal of the transformer 805, a capacitor element Cd disposed at an output terminal of the full-bridge diodes, a resistor element Rd disposed at both ends of the capacitor element Cd, and a switching controller 825.

The resistor element Rd in the converter 910x is disposed to reduce increase of output voltage under low-load or no-load conditions, but there is a problem in that the resistor element Rd consumes power regardless of load, causing unnecessary power consumption.

Meanwhile, if the converter 910x does not include the resistor element Rd, the increase of output voltages under low-load or no-load conditions.

Accordingly, the present disclosure proposes a method of preventing increase of output voltage under low-load or no-load conditions without including the resistor element in the converter, which will be described below with reference to FIG. 9 and subsequent figures.

Figure 9:
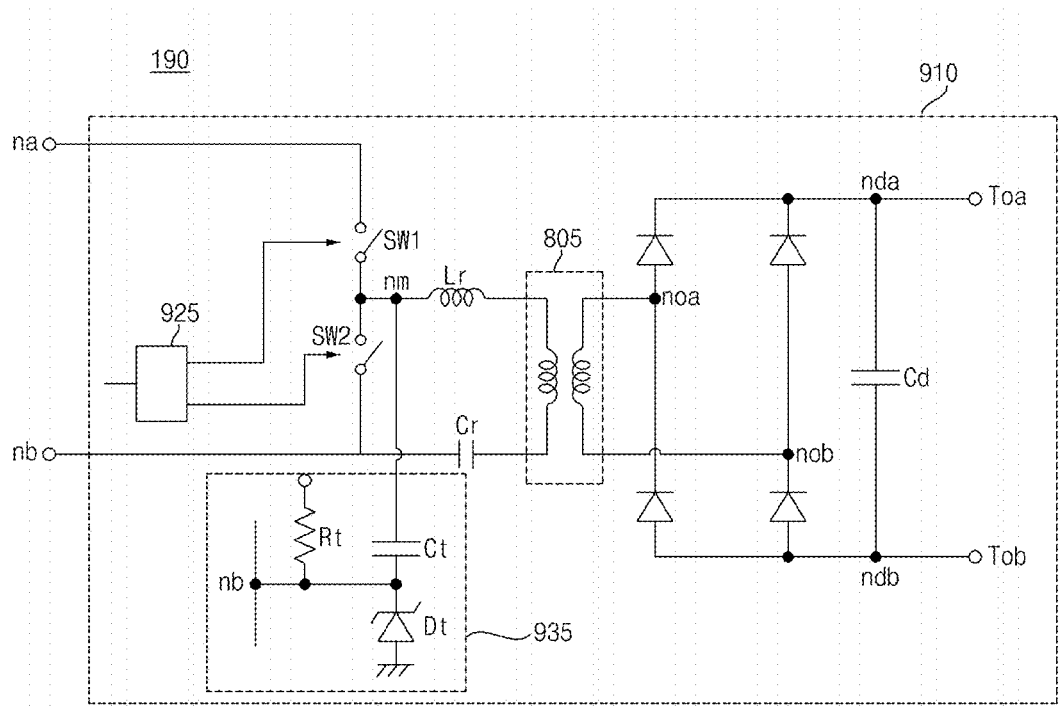
FIG. 9 is an exemplary circuit diagram of a power supply according to an embodiment of the present disclosure.

FIG. 9 is an exemplary circuit diagram of a power supply according to an embodiment of the present disclosure.

Referring to the drawing, the power supply 190 according to an embodiment of the present disclosure includes a converter 910 including switching elements SW1 and SW2 and configured to convert a level of an input DC voltage based on a switching operation of the switching elements SW1 and SW2 to output a display driving voltage Vdd.

The converter 910 according to an embodiment of the present disclosure operates in a first mode or a second mode in response to a load at an output terminal of the converter 910, in which in the first mode, the switching elements SW1 and SW2 perform a continuous switching operation at a first frequency, and in a second mode, the switching elements SW1 and SW2 perform the continuous switching operation and then stop the switching operation for a predetermined period or perform the switching operation at a second frequency lower than the first frequency.

Accordingly, it is possible to reduce increase of output voltage under low-load or no-load conditions. In addition, the display driving voltage Vdd may be stably supplied. Further, power consumption of the power supply 190 may be reduced.

Meanwhile, if a load at the output terminal of the converter 910 is lower than or equal to a reference value, the converter 910 may operate in the second mode in which the switching elements SW1 and SW2 perform the continuous switching operation and then stop the switching operation for a predetermined period or perform the switching operation at the second frequency. Accordingly, it is possible to reduce increase of output voltage under low-load or no-load conditions.

Meanwhile, if a load at the output terminal of the converter 910 exceeds the reference value, the converter 910 may operate in the first mode in which the switching elements SW1 and SW2 perform the continuous switching operation at the first frequency. Accordingly, a display voltage may be stably output under medium-load or high-load conditions.

Alternatively, if a load at the output terminal of the converter 910 is greater than or equal to a second reference value which is greater than the reference value, the converter 910 may operate in the first mode in which the switching elements SW1 and SW2 perform the continuous switching operation at the first frequency. Accordingly, a display voltage may be stably output under medium-load or high-load conditions.

Meanwhile, when a black image is displayed on the display 180, the converter 910 may operate in the second mode in which the switching elements SW1 and SW2 perform the continuous switching operation and then stop the switching operation for a predetermined period or perform the switching operation at the second frequency. Accordingly, it is possible to reduce increase of output voltage when a black image is displayed.

In another example, when a gray image having a gray level lower than or equal to a predetermined level is displayed on the display 180, the converter 910 may operate in the second mode in which the switching elements SW1 and SW2 perform the continuous switching operation and then stop the switching operation for a predetermined period or perform the switching operation at the second frequency. Accordingly, it is possible to reduce increase of output voltage when a gray image displayed.

In yet another example, when a white image is displayed on the display 180, the converter 910 may operate in the first mode in which the switching elements SW1 and SW2 perform the continuous switching operation at the first frequency. Accordingly, a display voltage may be stably output under medium-load or high-load conditions.

Meanwhile, the converter 910 may include a transformer 805, a first switching element SW1 and a second switching element SW2 which are disposed at an input terminal of the transformer 805 and are connected in series to each other, and a resonant capacitor Cr and a resonant inductor Lr which are disposed between and respectively connected to the input terminal of the transformer 805 and the second switching element SW2. Accordingly, the display driving voltage Vdd may be output based on resonance.

Meanwhile, the converter 910 may further include full-bridge diodes disposed at the output terminal of the transformer 805 and a capacitor element Cd disposed at the output terminal of the full-bridge diodes. Accordingly, the display driving voltage Vdd may be stably output based on resonance.

Meanwhile, it is desirable that the resistor element is not disposed at both ends of the capacitor element Cd. In comparison with FIG. 8, the resistor element Rd is not disposed, such that unnecessary power consumption due to the resistor element Rd may be reduced. Accordingly, power consumption of the power supply 190 may be reduced.

Meanwhile, the converter 910 may further include a voltage detection circuit 935 configured to detect a voltage across the second switching element SW2.

Meanwhile, if a voltage across the second switching element SW2, which is detected by the voltage detection circuit 935, is zero voltage, the converter 910 may turn on the second switching element SW2. Accordingly, it is possible to reduce noise by performing Zero Voltage Switching of the second switching element SW2.

Meanwhile, during operation in the second mode, if a voltage across the second switching element SW2, which is detected by the voltage detection circuit 935, is zero voltage, the converter 910 may turn on the second switching element SW2. Accordingly, it is possible to reduce noise by performing Zero Voltage Switching of the second switching element SW2.

Meanwhile, the voltage detection circuit 935 may include a capacitor Ct connected to a first node nm between the first switching element SW1 and the second switching element SW2, a Zener diode Dt disposed between the capacitor Ct and a ground terminal, and a resistor element Rt having one end connected to a second node nb between the capacitor Ct and the Zener diode Dt. Accordingly, the voltage across the second switching element SW2 may be stably detected.

Meanwhile, the converter 910 may further include a switching controller 925 configured to control the first switching element SW1 and the second switching element SW2.

Meanwhile, the switching controller 925 may control Zero Voltage Switching of the second switching element SW2 based on a voltage at the second node nb. Accordingly, it is possible to reduce noise by performing Zero Voltage Switching of the second switching element SW2.

Meanwhile, if a display power control-on mode is selected in a settings screen, the signal processing device 170 may control the power supply 190 to supply a display driving voltage of a first level to the display 180.

Meanwhile, if a display power control-off mode is selected in the settings screen, the signal processing device 170 may control the power supply 190 to supply a display driving voltage of a second level to the display 180.

Meanwhile, if the display power control-on mode is selected in the settings screen, the signal processing device 170 may control the power supply 190 to supply the display driving voltage of the first level to the display 180 based on the second mode.

Meanwhile, if the display power control-off mode is selected in the settings screen, the signal processing device 170 may control the power supply 190 to supply the display driving voltage of the second level to the display 180 based on the first mode.

In this case, the display driving voltage of the second level is desirably greater than the display driving voltage of the first level. Accordingly, various display driving voltages may be stably supplied in various modes.

Meanwhile, if Eco mode or Standard mode is selected in the settings screen, the signal processing device 170 may control the power supply 190 to supply the display driving voltage of the first level to the display 180.

Meanwhile, if Cinema mode or Game mode is selected in the settings screen, the signal processing device 170 may control the power supply 190 to supply the display driving voltage of the second level to the display 180.

Meanwhile, the power supply 190 according to an embodiment of the present disclosure varies the level of the display driving voltage based on the image output mode of the signal processing device 170.

Particularly, the power supply 190 outputs a higher-level display driving voltage in Cinema mode or Game mode than when the image output mode of the signal processing device 170 is Eco mode. Accordingly, various display driving voltages may be stably supplied in various modes.

FIGS. 10A to 13C are diagrams referred to in the description of FIG. 9.

Figure 10A:
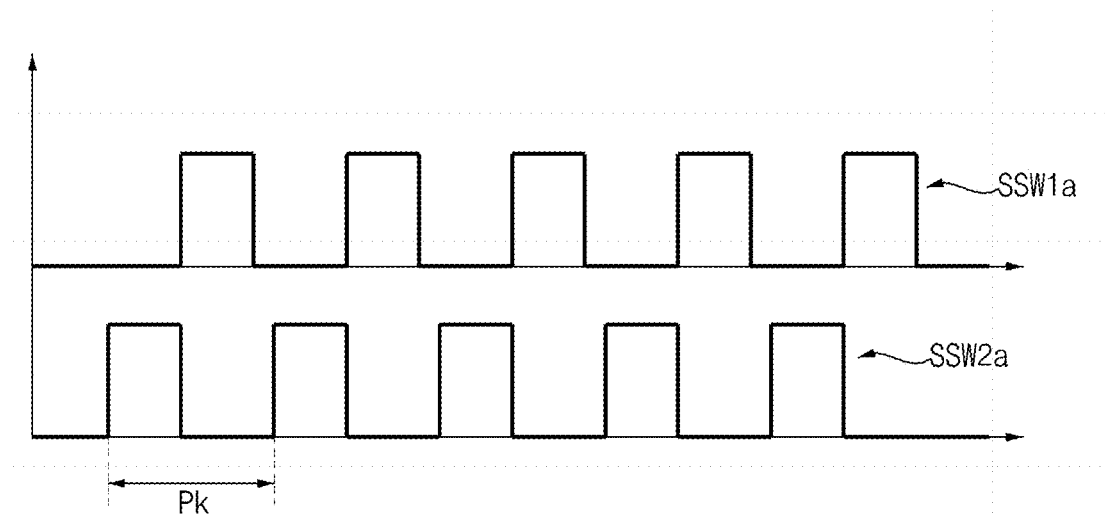
FIGS. 10A to 13C are diagrams referred to in the description of FIG. 9.

FIG. 10A is a diagram illustrating a waveform of a switching control signal for operation of the converter of FIG. 9 in a first mode.

Referring to the drawing, during operation in the first mode, the switching controller 925 may output a first switching control signal SS1a for the first switching element SW1 and a second switching control signal SS2a for the second switching element SW2.

In this case, the frequency of the first switching control signal SS1a for the first switching element SW1 and the second switching control signal SS2a for the second switching element SW2 may be a first frequency 1/Pk.

Accordingly, the converter 910 may stably output the display driving voltage Vdd in the first mode.

Figure 10B:
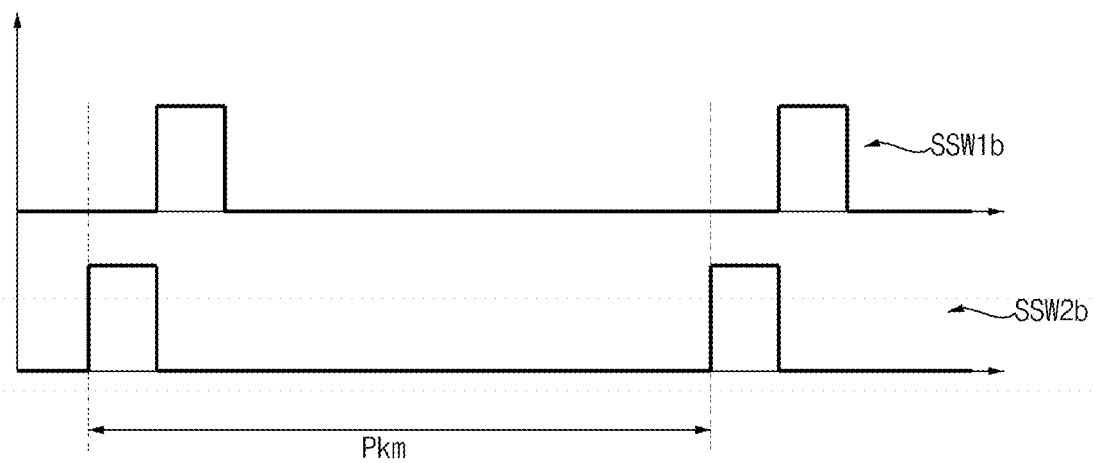

FIG. 10B is a diagram illustrating a waveform of a switching control signal for operation of the converter of FIG. 9 in a second mode.

Referring to the drawing, during operation in the second mode, the switching controller 925 may output a first switching control signal SS1b for the first switching element SW1 and a second switching control signal SS2b for the second switching element SW2.

In this case, the frequency of the first switching control signal SS1b for the first switching element SW1 and the second switching control signal SS2b for the second switching element SW2 may be a second frequency 1/Pkm which is lower than the first frequency.

Accordingly, during operation in the second mode, the converter 910 may reduce increase of output voltage under low-load or no-load conditions.

Meanwhile, unlike FIG. 10B, during operation in the second mode, the switching controller 925 may also turn off the first switching element SW1 and the second switching element SW2 for a predetermined period after the switching operation is performed at the first frequency. Accordingly, it is possible to reduce increase of output voltage under low-load or no-load conditions.

Meanwhile, the second frequency in the second mode may correspond to a frequency outside the audible frequency range. For example, the second frequency may be a frequency of 20 kHz or higher. Accordingly, it is possible to reduce increase of output voltage under low-load or no-load conditions while reducing noise.

Meanwhile, the first frequency in the first mode may also correspond to a frequency outside the audible frequency range. For example, the first frequency may be a frequency of 20 kHz or higher. Accordingly, a display voltage may be stably output under medium-load or high-load conditions while reducing noise.

Figure 11A:
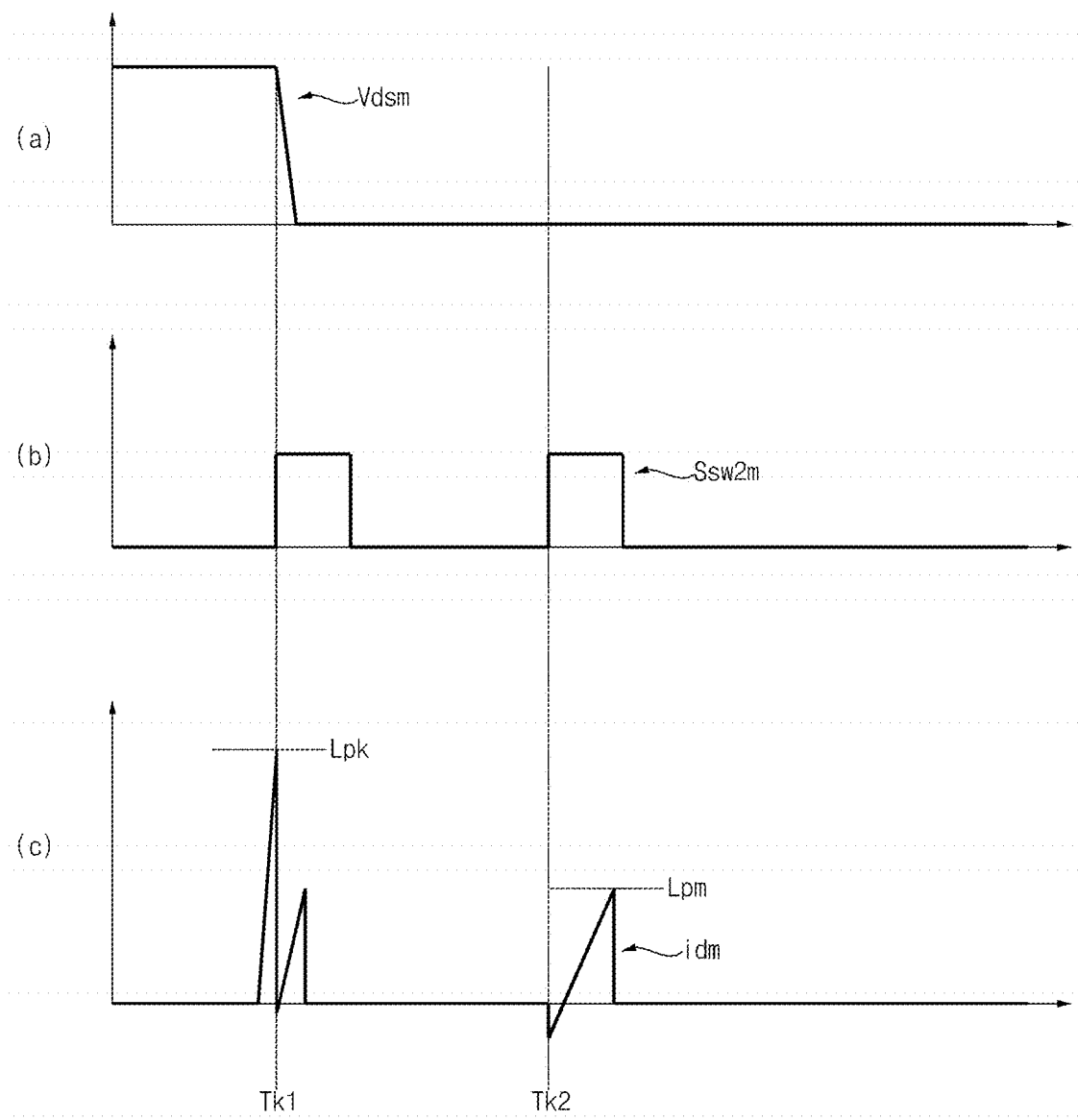

FIG. 11A is a diagram illustrating a relationship between a voltage of a second switching element and a current generated by switching of the second switching element.

Referring to the drawing, as illustrated in (a) of FIG. 11A, a voltage across the second switching element SW2 or a voltage Vdsm between drain and source thereof may be changed from a high level to a low level.

Meanwhile, as illustrated in (b) of FIG. 11A, a second switching control signal SSw2m for the second switching element SW2 may be input to a gate terminal of the second switching element SW2.

Meanwhile, at a time point Tk1, the second switching control signal SSw2m is changed to a high level such that the second switching element SW2 is turned on, the voltage Vdsm between the drain and source of the second switching element SW2 is not a zero voltage but a high-level voltage, such that a current idm at an instantaneous peak level Lpk flows through the second switching element SW2, as illustrated in (c) of FIG. 11A.

The current idm at the instantaneous peak level Lpk causes noise.

Meanwhile, at a time point Tk2, the second switching control signal SSw2m is changed to a high level such that the second switching element SW2 is turned on, the voltage Vdsm between the drain and source of the second switching element SW2 is zero voltage, such that a current idm at an instantaneous peak level Lpm, which is much lower than Lpk, flows through the second switching element SW2.

Accordingly, in the present disclosure, Zero Voltage Switching is controlled to be performed when the second switching element SW2 is turned on.

Figure 11B:
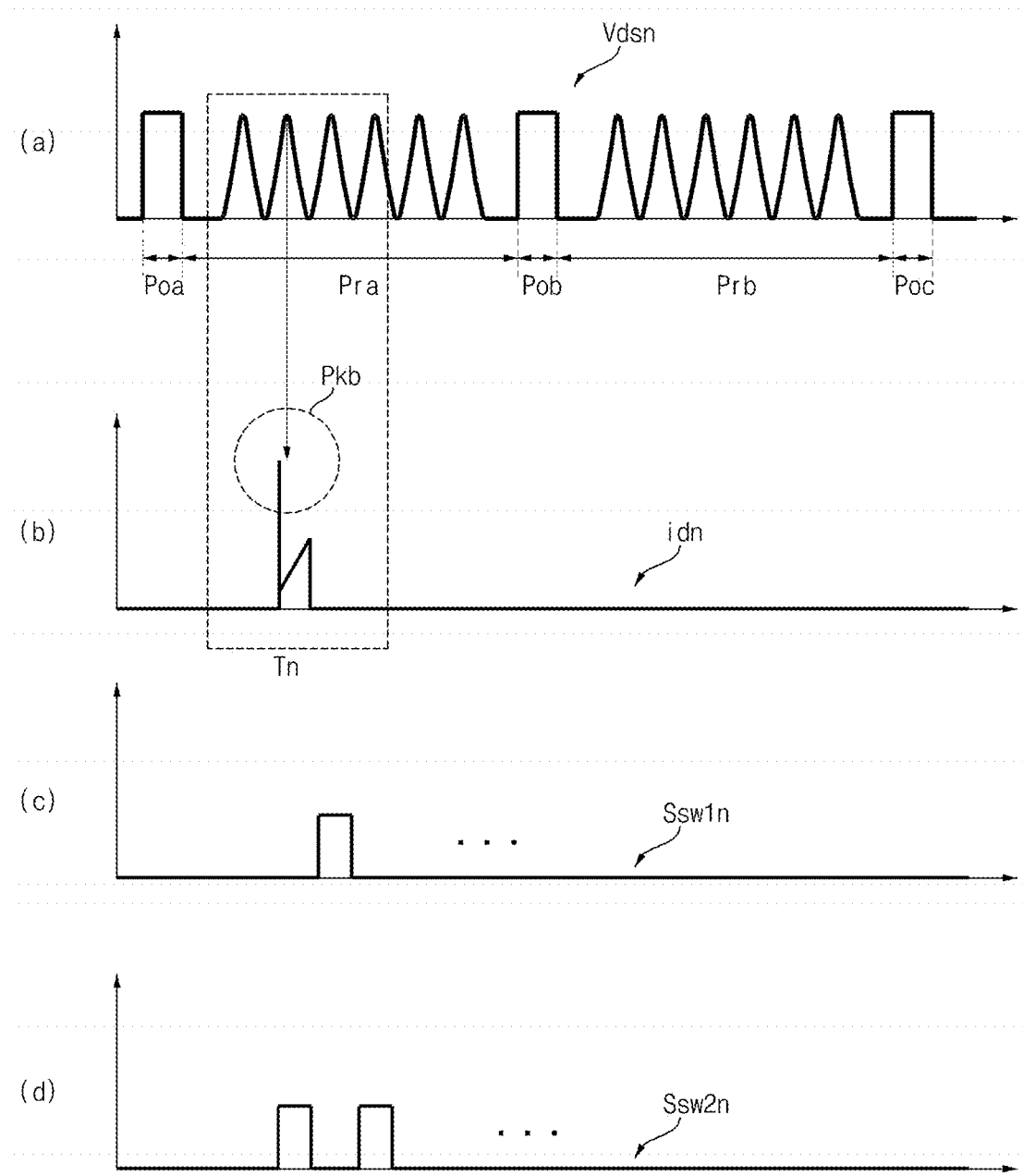

FIG. 11B is a diagram illustrating an example of switching of the second switching element SW2.

Referring to the drawing, (a) of FIG. 11B illustrates a voltage Vdsn between the drain and source of the second switching element SW2.

That is, the voltage is maintained at a high level in each of intervals Poa, Pob, and Poc, and may be represented as a sinusoidal function in an interval Pra between Poa and Pob and an interval Prb between Pob and Poc.

In FIG. 11b, (c) and (d) may be a first switching control signal SSw1n for the first switching element SW1 and a second switching control signal SSw2n for the second switching element SW2, respectively.

If the second switching control signal SSw2n for the second switching element SW2 is changed to a high level at a time point Tn, the second switching element SW2 is turned on, but a voltage Vdsn between the drain and source of the second switching element SW2 is not zero voltage, such that a current idn at a peak level is generated as illustrated in (b) of FIG. 11B, thereby causing noise.

Figure 11C:
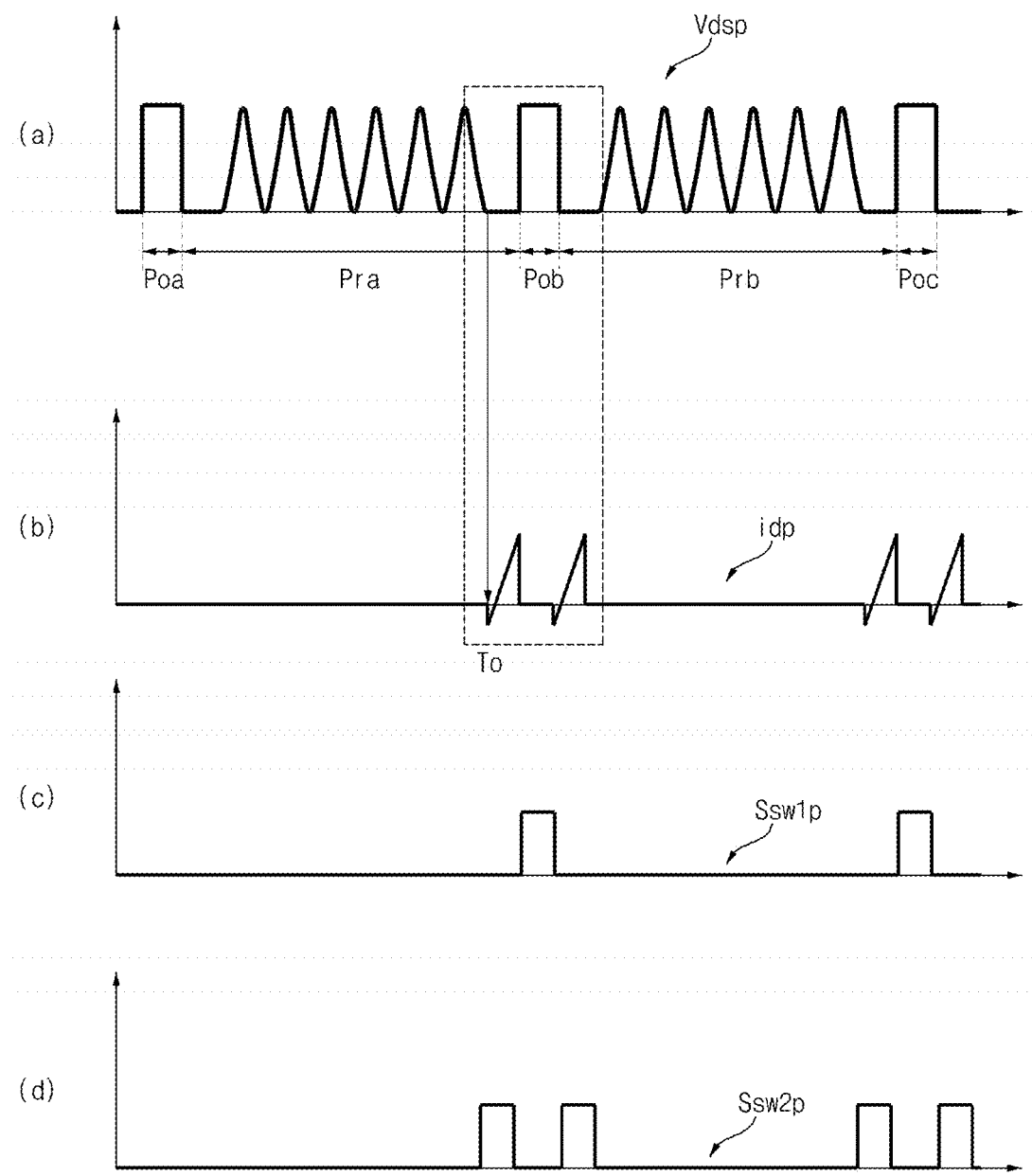

FIG. 11C is a diagram illustrating an example of Zero Voltage Switching of the second switching element SW2.

Referring to the drawing, (a) of FIG. 11C illustrates a voltage Vdsp between the drain and source of the second switching element SW2.

That is, the voltage is maintained at a high level in each of intervals Poa, Pob, and Poc, and may be represented as a sinusoidal function in an interval Pra between Poa and Pob and an interval Prb between Pob and Poc.

In FIG. 11C, (c) and (d) may be a first switching control signal SSw1p for the first switching element SW1 and a second switching control signal SSw2p for the second switching element SW2, respectively.

If the second switching control signal SSw2p for the second switching element SW2 is changed to a high level at a time point To, the second switching element SW2 is turned on, but a voltage Vdsp between the drain and source of the second switching element SW2 is zero voltage, such that a current idp at a predetermined level is generated as illustrated in (b) of FIG. 11C, thereby causing no noise or significantly reducing noise.

Meanwhile, for Zero Voltage Switching, the switching controller 925 may receive in real time a voltage across the second switching element SW2 or a voltage between the drain and source of the second switching element SW2 from the voltage detection circuit 935 that detects the voltage across the second switching element SW2. Accordingly, Zero Voltage Switching may be stably performed.

Meanwhile, the converter 910 in the image display apparatus 100 according to another embodiment of the present disclosure operates in a first mode or a second mode in response to a load at the output terminal of the converter 910, in which in the first mode, the switching elements SW1 and SW2 perform a continuous switching operation with a first duty Gp, and in a second mode, the switching elements SW1 and SW2 perform a switching operation with a second duty GPb which is less than the first duty. A description thereof will be given below with reference to FIGS. 12A and 12B.

Figure 12A:
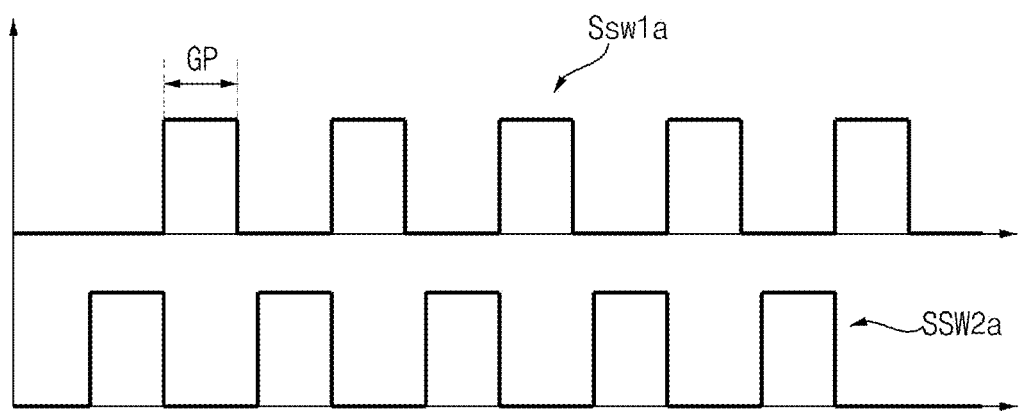

FIG. 12A is a diagram illustrating a switching control signal with a first duty.

Referring to the drawing, the switching controller 925 may control each of the first switching element SW1 and the second switching element SW2 to perform a switching operation with the first duty GP.

In the drawing, a first switching control signal Ssw1a and a second switching control signal Ssw2a based on the first duty GP are illustrated.

Meanwhile, if a load at the output terminal of the converter 910 exceeds a reference value, the converter 910 may switch the switching elements SW1 and SW2 with the first duty GP.

Meanwhile, if a load at the output terminal of the converter 910 is greater than or equal to a second reference value which is greater than the reference value, the converter 910 may switch the switching elements SW1 and SW2 with the first duty GP.

Meanwhile, when a white image is displayed on the display 180, the converter 910 may operate in the first mode for switching the switching elements SW1 and SW2 with the first duty GP. Accordingly, the display driving voltage may be stably output when the white image is displayed.

Figure 12B:
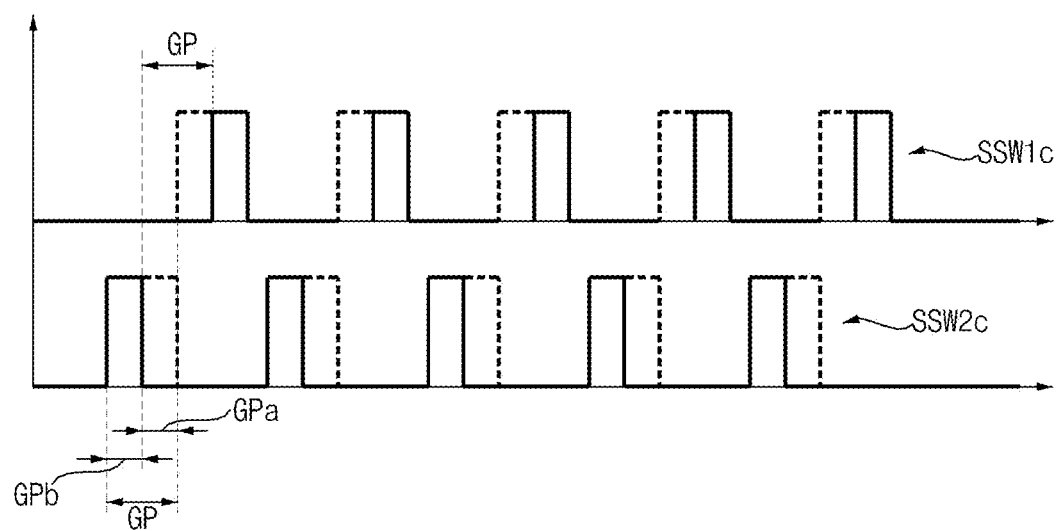

FIG. 12B is a diagram illustrating a switching control signal with a second duty.

Referring to the drawing, the switching controller 925 may control each of the first switching element SW1 and the second switching element SW2 to perform a switching operation with the second duty GPb.

In the drawing, a first switching control signal Ssw1c and a second switching control signal Ssw2c based on the second duty GPb are illustrated.

Meanwhile, the second duty GPb is desirably less than the first duty GP.

In the drawing, of the ON time Gpb and OFF time Gpa of the first duty GP, the ON time corresponds to the second duty.

Meanwhile, if a load at the output terminal of the converter 910 is lower than or equal to a reference value, the converter 910 may switch the switching elements SW1 and SW2 with the second duty GPb.

Meanwhile, if a load at the output terminal of the converter 910 is greater than or equal to a second reference value which is greater than the reference value, the converter 910 may switch the switching elements SW1 and SW2 with the first duty GP.

Meanwhile, when a black image is displayed on the display 180, the converter 910 may operate in the second mode for switching the switching elements SW1 and SW2 with the second duty GPb. Accordingly, it is possible to reduce increase of output voltage when the black image is displayed.

Figure 13A:
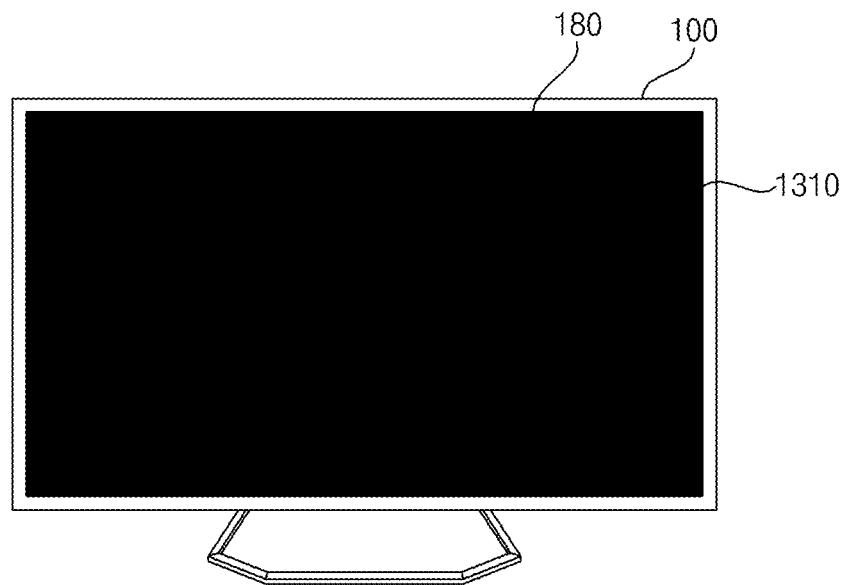

FIG. 13A is a diagram illustrating an example in which a black image 1310 is displayed on the display 180.

Referring to the drawing, when the black image 1310 is displayed on the display 180, the converter 910 according to an embodiment of the present disclosure may operate in the second mode in which the switching elements SW1 and SW2 perform a continuous switching operation and then stop the switching operation for a predetermined period or perform the switching operation at the second frequency. Accordingly, it is possible to reduce increase of output voltage when the black image is displayed.

Meanwhile, when the black image 1310 is displayed on the display 180, the converter 910 according to another embodiment of the present disclosure may operate in the second mode for switching the switching elements SW1 and SW2 with the second duty GPb.

Figure 13B:
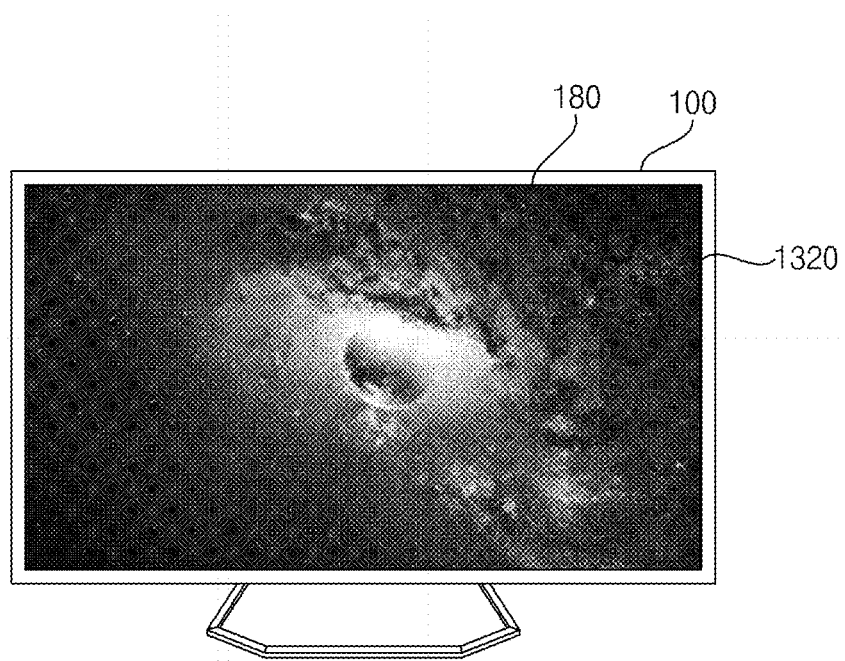

FIG. 13B is a diagram illustrating an example in which a predetermined image 1320 is displayed on the display 180.

Referring to the drawing, when the predetermined image 1320 is displayed on the display 180, if a load at the output terminal of the converter 910 exceeds a reference value, the converter 910 according to an embodiment of the present disclosure may operate in the first mode in which the switching elements SW1 and SW2 perform a continuous switching operation at the first frequency. Accordingly, it is possible to reduce increase of output voltage when the black image is displayed.

Meanwhile, when the predetermined image 1320 is displayed on the display 180, if a load at the output terminal of the converter 910 exceeds the reference value, the converter 910 according to another embodiment of the present disclosure may operate in the first mode for switching the switching elements SW1 and SW2 with the first duty GP.

Figure 13C:
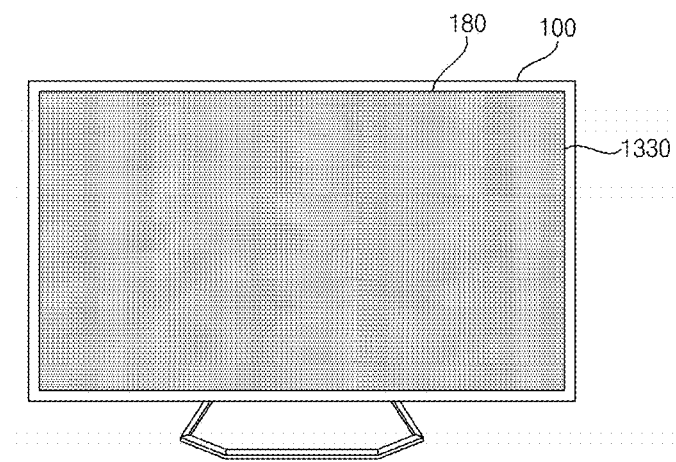

FIG. 13C is a diagram illustrating an example in which a gray image 1330 is displayed on the display 180.

Referring to the drawing, when the gray image 1330 having a gray level lower than or equal to a predetermined level is displayed on the display 180, the converter 910 according to an embodiment of the present disclosure may operate in the second mode in which the switching elements SW1 and SW2 perform a continuous switching operation and then stop the switching operation for a predetermined period or perform the switching operation at the second frequency. Accordingly, it is possible to reduce increase of output voltage when the gray image is displayed.

Meanwhile, when the gray image 1330 having a gray level lower than or equal to a predetermined level is displayed on the display 180, the converter 910 according to another embodiment of the present disclosure may operate in the second mode for switching the switching elements SW1 and SW2 with the second duty GPb.

FIGS. 14A to 14D are flowcharts illustrating an operating method of an image display apparatus according to various embodiments of the present disclosure.

Figure 14A:
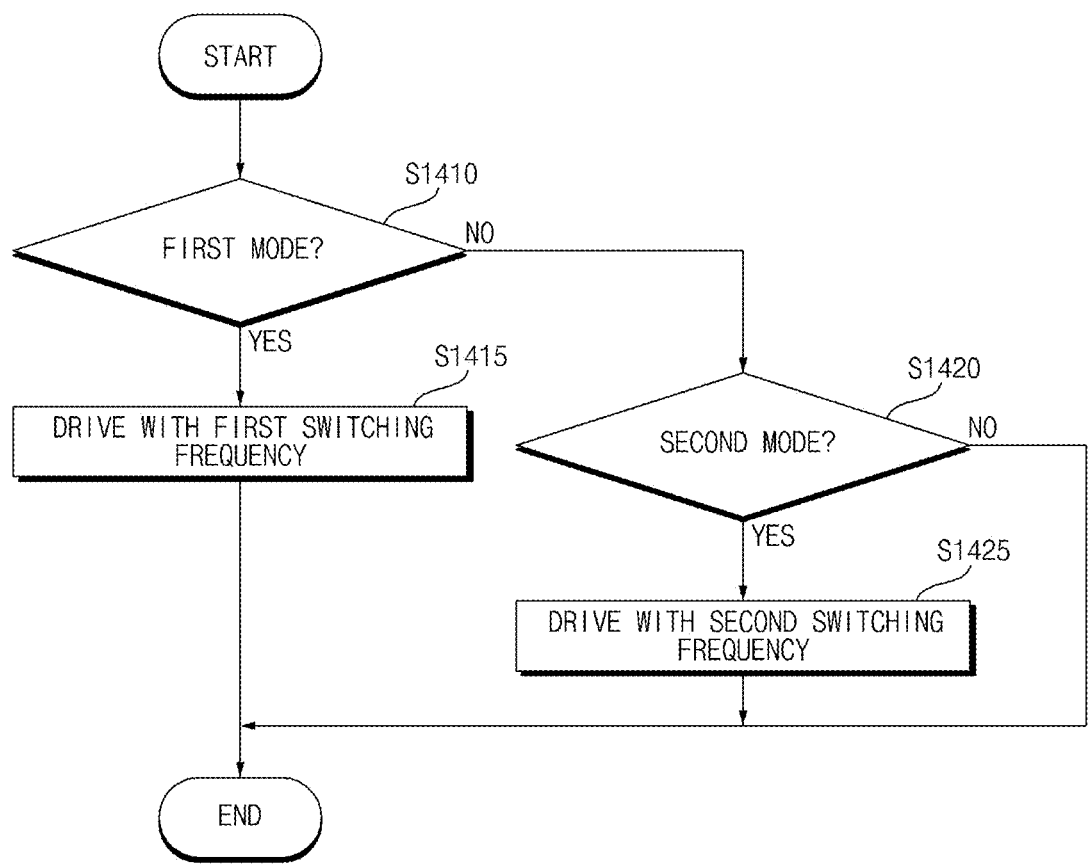
FIGS. 14A to 14D are flowcharts illustrating an operating method of an image display apparatus according to various embodiments of the present disclosure.

FIG. 14A is a flowchart illustrating an operating method of an image display apparatus according to an embodiment of the present disclosure.

Referring to the drawing, the converter 910 or the signal processing device 170 in the image display apparatus 100 according to an embodiment of the present disclosure may determine whether an operating mode is a first mode, based on the load at the output terminal of the converter 910 (S1410).

For example, the signal processing device 170 may identify a level of the load at the output terminal of the converter 910 based on a luminance level of an image to be displayed on the display 180, and may transmit information about the identified load level to the switching controller 925 in the power supply 190.

If a level of the load at the output terminal of the converter 910 is lower than or equal to a reference value, the signal processing device 170 or the switching controller 925 in the converter 910 may determine that the operating mode is the first mode.

Meanwhile, if the load at the output terminal of the converter 910 is lower than or equal to the reference value, the converter 910 may perform the first mode in which the switching elements SW1 and SW2 perform a continuous switching operation at the first frequency (S1415). Accordingly, the display driving voltage Vdd may be stably output to the display 180.

Meanwhile, if the operating mode is not the first mode in operation 1410 (S1410), the converter 910 or the signal processing device 170 in the image display apparatus 100 may determine whether the operating mode is a second mode, based on the load at the output terminal of the converter 910 (S1420).

For example, if a level of the load at the output terminal of the converter 910 exceeds the reference value, the signal processing device 170 or the switching controller 925 in the converter 910 may determine that the operating mode is the second mode.

Meanwhile, if the load at the output terminal of the converter 910 exceeds the reference value, the converter 910 performs the second mode in which the switching elements SW1 and SW2 perform the continuous switching operation and then stop the switching operation for a predetermined period or perform the switching operation at the second frequency which is lower than the first frequency (S1425). Accordingly, it is possible to reduce increase of output voltage under low-load or no-load conditions.

Figure 14B:
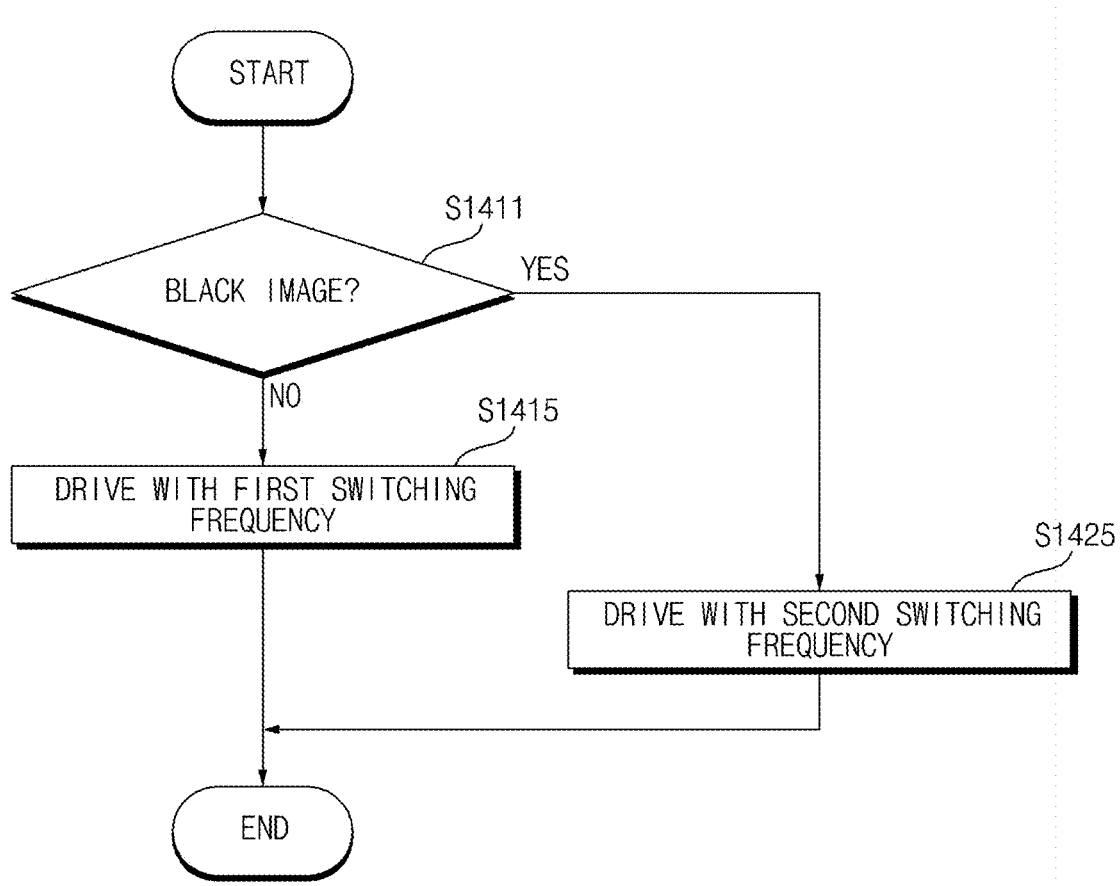

FIG. 14B is a flowchart illustrating an operating method of an image display apparatus according to another embodiment of the present disclosure.

Referring to the drawing, the converter 910 or the signal processing device 170 in the image display apparatus 100 according to an embodiment of the present disclosure may determine whether a black image is displayed on the display 180 (S 1411).

For example, the signal processing device 170 may determine whether an image to be displayed on the display 180 is a black image, and may transmit information about the black image to the switching controller 925 in the power supply 190.

Meanwhile, if the image to be displayed on the display 180 is not the black image, the converter 910 performs the first mode in which the switching elements SW1 and SW2 perform a continuous switching operation at the first frequency (S1415). Accordingly, the display driving voltage Vdd may be stably output on the display 180.

Meanwhile, if the image to be displayed on the display 180 is the black image in operation 1411 (S1411), the converter 910 in the image display apparatus 100 performs the second mode in which the switching elements SW1 and SW2 perform the continuous switching operation and then stop the switching operation for a predetermined period or perform the switching operation at the second frequency which is lower than the first frequency (S1425). Accordingly, it is possible to reduce increase of output voltage when the black image is displayed.

Figure 14C:
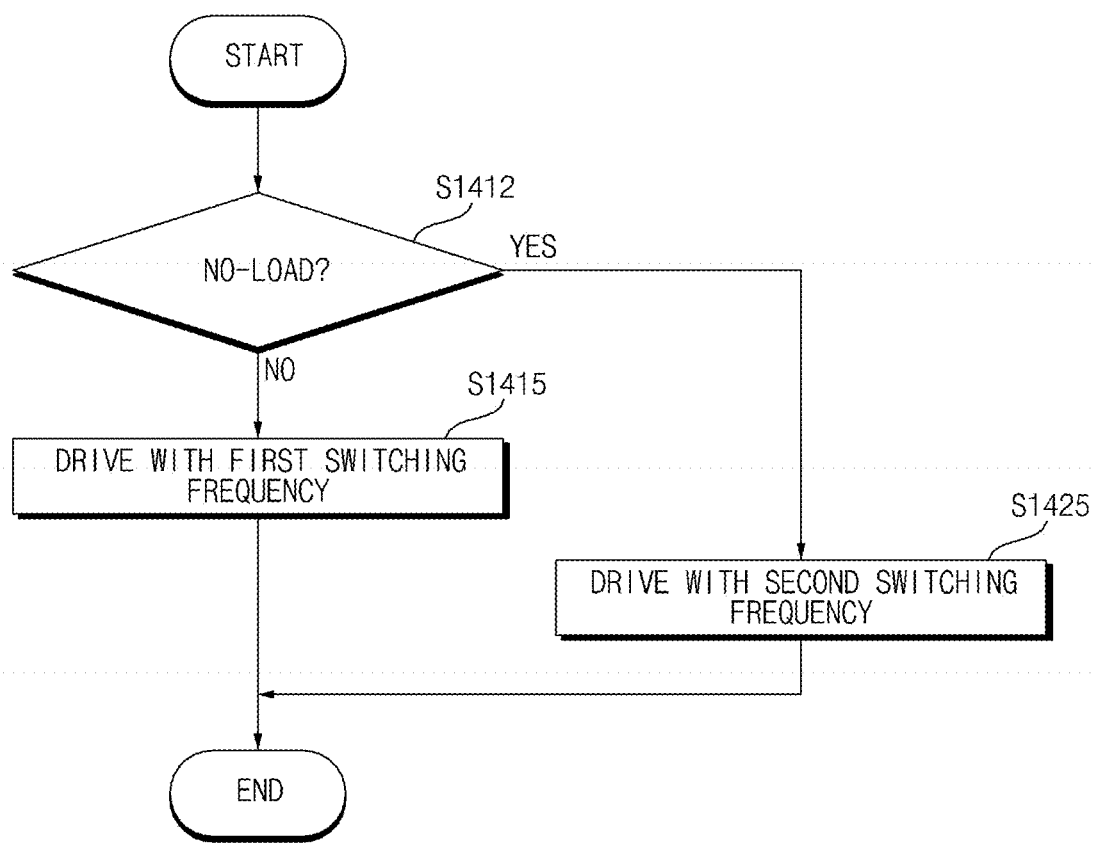

FIG. 14C is a flowchart illustrating an operating method of an image display apparatus according to yet another embodiment of the present disclosure.

Referring to the drawing, the converter 910 or the signal processing device 170 in the image display apparatus 100 according to an embodiment of the present disclosure may determine whether the output terminal of the converter 910 is under no-load condition (S1412).

For example, if an image to be displayed on the display 180 is a black image, the signal processing device 170 may determine a no-load condition, and transmits information about the no-load condition to the switching controller 925 in the power supply 190.

Meanwhile, if the output terminal of the converter 910 is not under no-load condition, the converter 910 performs the first mode in which the switching elements SW1 and SW2 perform a continuous switching operation at the first frequency (S1415). Accordingly, the display driving voltage Vdd may be stably output to the display 180.

Meanwhile, if the output terminal of the converter 910 is under no-load condition in operation 1412 (S1412), the converter 910 in the image display apparatus 100 performs the second mode in which the switching elements SW1 and SW2 perform the continuous switching operation and then stop the switching operation for a predetermined period or perform the switching operation at the second frequency which is lower than the first frequency (S1425). Accordingly, it is possible to reduce increase of output voltage when the output terminal of the converter 910 is under no-load condition.

Figure 14D:
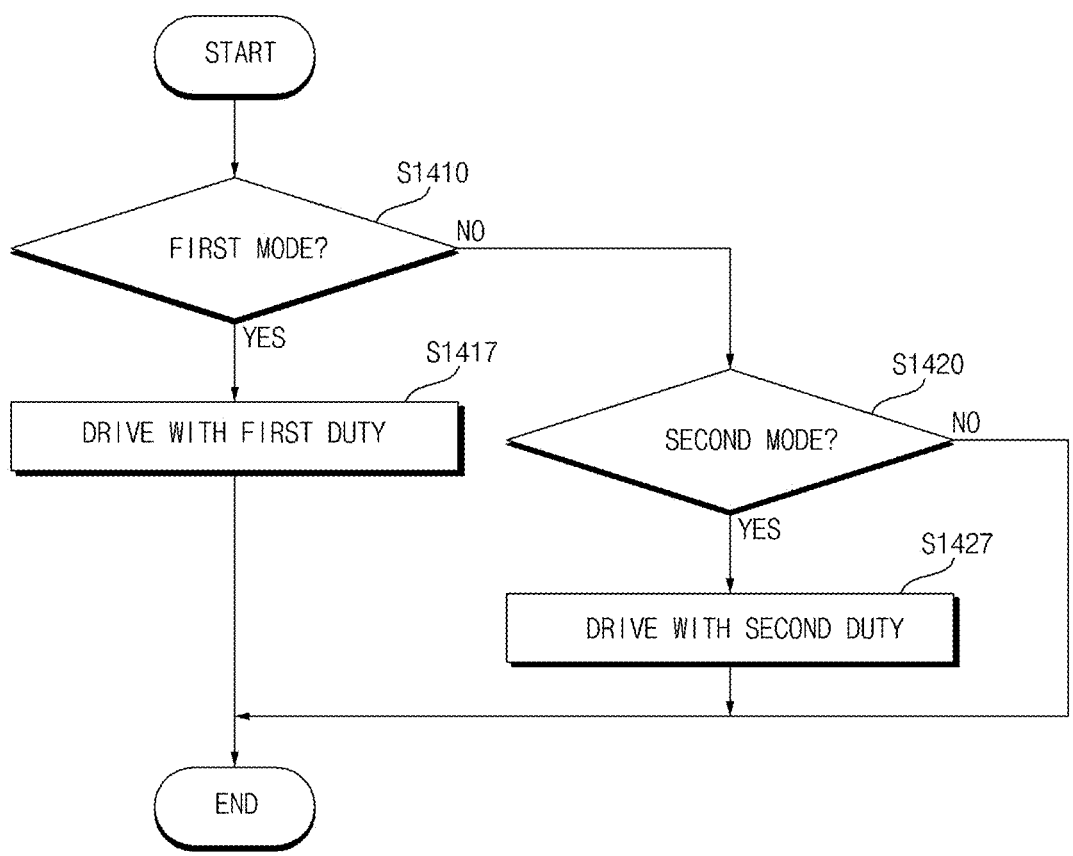

FIG. 14D is a flowchart illustrating an operating method of an image display apparatus according to further another embodiment of the present disclosure.

Referring to the drawing, the converter 910 or the signal processing device 170 in the image display apparatus 100 according to an embodiment of the present disclosure may determine whether an operating mode is a first mode, based on the load at the output terminal of the converter 910 (S1410).

For example, if a level of the load at the output terminal of the converter 910 is lower than or equal to a reference value, the signal processing device 170 or the switching controller 925 in the converter 910 may determine that the operating mode is the first mode.

Meanwhile, if a level of the load at the output terminal of the converter 910 is lower than or equal to the reference value, the converter 910 performs the first mode in which the switching elements SW1 and SW2 perform a continuous switching operation with the first duty Gp (S1417). Accordingly, the display driving voltage Vdd may be stably output to the display 180.

Meanwhile, if the operating mode is not the first mode in operation 1410 (S1410), the converter 910 or the signal processing device 170 in the image display apparatus 100 may determine whether an operating mode is a second mode, based on the load at the output terminal of the converter 910 (S1420).

For example, if a level of the load at the output terminal of the converter 910 exceeds the reference value, the signal processing device 170 or the switching controller 925 in the converter 910 may determine that the operating mode is the second mode.

Meanwhile, if a level of the load at the output terminal of the converter 910 exceeds the reference value, the converter 910 performs the second mode in which the switching elements SW1 and SW2 perform a switching operation with the second duty GPb which is less than the first duty Gp (S1427). Accordingly, it is possible to reduce increase of output voltage under low-load or no-load conditions.

As described above, an image display apparatus according to an embodiment of the present disclosure includes: a display; a signal processing device configured to output an image signal to the display; and a power supply configured to supply a display driving voltage to the display, wherein the power supply comprises a converter including switching elements and configured to convert a level of an input DC voltage based on a switching operation of the switching elements and output the display driving voltage, wherein in response to a load at an output terminal of the converter, the converter is configured to operate in a first mode, in which the switching elements perform a continuous switching operation at a first frequency, and in a second mode in which the switching elements perform the continuous switching operation and then stop the switching operation for a predetermined period or perform the switching operation at a second frequency lower than the first frequency. Accordingly, it is possible to reduce increase of output voltage under low-load or no-load conditions. In addition, the display driving voltage may be stably supplied. Further, power consumption of the power supply may be reduced.

Meanwhile, in response to the load at the output terminal of the converter being lower than or equal to a reference value, the converter may be configured to operate in the second mode in which the switching elements perform the continuous switching operation and then stop the switching operation for the predetermined period or perform the switching operation at the second frequency. Accordingly, it is possible to reduce increase of output voltage under low-load or no-load conditions.

Meanwhile, in response to a black image being displayed on the display, the converter may be configured to operate in the second mode in which the switching elements perform the continuous switching operation and then stop the switching operation for the predetermined period or perform the switching operation at the second frequency. Accordingly, it is possible to reduce increase of output voltage when the black image is displayed.

Meanwhile, the converter may include: a transformer; a first switching element and a second switching element disposed at an input terminal of the transformer and connected in series with each other; and a resonant capacitor and a resonant inductor disposed between and respectively connected to the input terminal of the transformer and the second switching element. Accordingly, the display driving voltage may be output based on resonance.

Meanwhile, the converter may further include: full-bridge diodes disposed at an output terminal of the transformer; and a capacitor element disposed at an output terminal of the full-bridge diodes. Accordingly, the display driving voltage may be stably output based on resonance.

Meanwhile, it is desirable that the resistor element is not disposed at both ends of the capacitor element. Accordingly, power consumption of the power supply may be reduced.

Meanwhile, the second frequency may correspond to a frequency outside an audible frequency range. Accordingly, it is possible to reduce increase of output voltage under low-load or no-load conditions while reducing noise.

Meanwhile, the converter may further include a voltage detection circuit configured to detect a voltage across the second switching element. Accordingly, it is possible to reduce noise by performing Zero Voltage Switching of the second switching element.

Meanwhile, in response to the voltage across the second switching element, which is detected by the voltage detection circuit, being zero voltage, the converter may be configured to turn on the second switching element. Accordingly, it is possible to reduce noise by performing Zero Voltage Switching of the second switching element.

Meanwhile, during operation in the second mode, in response to the voltage across the second switching element, which is detected by the voltage detection circuit, being zero voltage, the converter may be configured to turn on the second switching element. Accordingly, it is possible to reduce noise by performing Zero Voltage Switching of the second switching element.

Meanwhile, the voltage detection circuit may include: a capacitor connected to a first node between the first switching element and the second switching element; a Zener diode disposed between the capacitor and a ground terminal; and a resistor element having one end connected to a second node between the capacitor and the Zener diode. Accordingly, the voltage across the second switching element may be stably detected.

Meanwhile, the converter may further include a switching controller configured to control the first switching element and the second switching element, wherein the switching controller may be configured to control zero voltage switching of the second switching element based on a voltage at the second node. Accordingly, it is possible to reduce noise by performing Zero Voltage Switching of the second switching element.

Meanwhile, the power supply may further include a second converter configured to convert an input AC voltage into a DC voltage, wherein the converter may be configured to convert the DC voltage from the second converter and output the display driving voltage to the display. Accordingly, the display driving voltage may be stably supplied.

Meanwhile, the signal processing device may be configured to: in response to a display power control-on mode being selected in a settings screen, control the power supply to supply a display driving voltage of a first level to the display; and in response to a display power control-off mode being selected in the settings screen, control the power supply to supply a display driving voltage of a second level to the display. Accordingly, various display driving voltages may be stably supplied in various modes.

Meanwhile, the signal processing device may be configured to: in response to a display power control-on mode being selected in a settings screen, control the power supply to supply the display driving voltage of the first level to the display based on the second mode; and in response to a display power control-off mode being selected in the settings screen, control the power supply to supply the display driving voltage of the second level to the display based on the first mode. Accordingly, various display driving voltages may be stably supplied in various modes.

An image display apparatus according to another embodiment of the present disclosure includes: a display; a signal processing device configured to output an image signal to the display; and a power supply configured to supply a display driving voltage to the display, wherein the power supply includes a converter including switching elements and configured to convert a level of an input DC voltage based on a switching operation of the switching elements and output the display driving voltage, wherein in response to a load at an output terminal of the converter, the converter is configured to operate in a first mode, in which the switching elements perform a continuous switching operation with a first duty, and in a second mode in which the switching elements perform the switching operation with a second duty less than the first duty. Accordingly, it is possible to reduce increase of output voltage under low-load or no-load conditions. In addition, the display driving voltage may be stably supplied. Further, power consumption of the power supply may be reduced.

Meanwhile, in response to the load at the output terminal of the converter being lower than or equal to a reference value, the converter may be configured to operate in the second mode in which the switching elements perform the switching operation with the second duty. Accordingly, it is possible to reduce increase of output voltage under low-load or no-load conditions.

Meanwhile, in response to a black image being displayed on the display, the converter may be configured to operate in the second mode in which the switching elements perform the switching operation with the second duty. Accordingly, it is possible to reduce increase of output voltage when the black image is displayed.

Meanwhile, the converter may include: a transformer; a first switching element and a second switching element disposed at an input terminal of the transformer and connected in series with each other; and a resonant capacitor and a resonant inductor disposed between and respectively connected to the input terminal of the transformer and the second switching element. Accordingly, the display driving voltage may be stably output based on resonance.

It will be apparent that, although the preferred embodiments have been illustrated and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. An image display apparatus comprising:
a display;
a signal processing device configured to output an image signal to the display; and
a power supply configured to supply a display driving voltage to the display,
wherein the power supply comprises a converter,
wherein the converter includes switching elements and is configured to:
convert a level of an input DC voltage based on a switching operation of the switching elements, and output the display driving voltage,
wherein, in response to a load at an output terminal of the converter, the converter is configured to:
operate in a first mode, in which the switching elements perform a continuous switching operation at a first frequency, and
operate in a second mode in which the switching elements perform the continuous switching operation and then stop the switching operation for a predetermined period or perform the switching operation at a second frequency lower than the first frequency,
wherein the converter further comprises a transformer,
wherein the switching elements comprise a first switching element and a second switching element disposed at an input terminal of the transformer and connected in series with each other,
wherein the converter further comprises a resonant capacitor and a resonant inductor disposed between and respectively connected to the input terminal of the transformer and the second switching element, and
wherein the converter further comprises a voltage detection circuit configured to detect a voltage across the second switching element.

2. The image display apparatus of claim 1, wherein, in response to the load at the output terminal of the converter being lower than or equal to a reference value, the converter is configured to operate in the second mode in which the switching elements perform the continuous switching operation and then stop the switching operation for the predetermined period or perform the switching operation at the second frequency.

3. The image display apparatus of claim 1, wherein, in response to a black image being displayed on the display, the converter is configured to operate in the second mode in which the switching elements perform the continuous switching operation and then stop the switching operation for the predetermined period or perform the switching operation at the second frequency.

4. The image display apparatus of claim 1, wherein the converter further comprises:
full-bridge diodes disposed at an output terminal of the transformer; and
a capacitor element disposed at output terminals of the full-bridge diodes.

5. The image display apparatus of claim 1, wherein in response to the voltage detection circuit detecting the voltage across the second switching element being zero voltage, the converter is configured to turn on the second switching element.

6. The image display apparatus of claim 1, wherein, during operation in the second mode, in response to the voltage detection circuit detecting the voltage across the second switching element being zero voltage, the converter is configured to turn on the second switching element.

7. The image display apparatus of claim 6, wherein the voltage detection circuit comprises:
a capacitor connected to a first node between the first switching element and the second switching element;
a Zener diode disposed between the capacitor and a ground terminal; and
a resistor element having one end connected to a second node between the capacitor and the Zener diode.

8. The image display apparatus of claim 7,
wherein the converter further comprises a switching controller configured to control the first switching element and the second switching element,
wherein the switching controller is configured to control zero voltage switching of the second switching element based on a voltage at the second node.

9. The image display apparatus of claim 1, wherein the power supply further comprises a second converter configured to convert an input AC voltage into a DC voltage, wherein the converter is configured to convert the DC voltage from the second converter and output the display driving voltage to the display.

10. The image display apparatus of claim 1, wherein the signal processing device is configured to:
   in response to a display power control-on mode being selected in a settings screen, control the power supply to supply a display driving voltage of a first level to the display; and
   in response to a display power control-off mode being selected in the settings screen, control the power supply to supply a display driving voltage of a second level to the display.

11. The image display apparatus of claim 1, wherein the signal processing device is configured to:
   in response to a display power control-on mode being selected in a settings screen, control the power supply to supply the display driving voltage of a first level to the display based on the second mode; and
   in response to a display power control-off mode being selected in the settings screen, control the power supply to supply the display driving voltage of a second level to the display based on the first mode.

12. An image display apparatus comprising:
   a display;
   a signal processing device configured to output an image signal to the display; and
   a power supply configured to supply a display driving voltage to the display,
   wherein the power supply comprises a converter,
   wherein the converter includes switching elements and is configured to:
      convert a level of an input DC voltage based on a switching operation of the switching elements, and output the display driving voltage,
   wherein, in response to a load at an output terminal of the converter, the converter is configured to:
      operate in a first mode, in which the switching elements perform a continuous switching operation with a first duty, and
      operate in a second mode in which the switching elements perform the switching operation with a second duty less than the first duty,
   wherein the converter further comprises a transformer,
   wherein the switching elements comprise a first switching element and a second switching element disposed at an input terminal of the transformer and connected in series with each other,
   wherein the converter further comprises a resonant capacitor and a resonant inductor disposed between and respectively connected to the input terminal of the transformer and the second switching element, and
   wherein the converter further comprises a voltage detection circuit configured to detect a voltage across the second switching element.

13. The image display apparatus of claim 12, wherein, in response to the load at the output terminal of the converter being lower than or equal to a reference value, the converter is configured to operate in the second mode in which the switching elements perform the switching operation with the second duty.

14. The image display apparatus of claim 13, wherein, in response to a black image being displayed on the display, the converter is configured to operate in the second mode in which the switching elements perform the switching operation with the second duty.

15. The image display apparatus of claim 12, wherein the voltage detection circuit comprises:
   a capacitor connected to a first node between the first switching element and the second switching element;
   a Zener diode disposed between the capacitor and a ground terminal; and
   a resistor element having one end connected to a second node between the capacitor and the Zener diode.

16. The image display apparatus of claim 15, wherein the converter further comprises a switching controller configured to control the first switching element and the second switching element,
   wherein the switching controller is configured to control zero voltage switching of the second switching element based on a voltage at the second node.

* * * * *